US012748694B2

(12) United States Patent
Chun et al.

(10) Patent No.: US 12,748,694 B2
(45) Date of Patent: Sep. 29, 2026

(54) STORAGE DEVICE AND STORAGE SYSTEM INCLUDING THE SAME

(71) Applicant: SAMSUNG ELECTRONICS CO., LTD., Suwon-si (KR)

(72) Inventors: Hojin Chun, Suwon-si (KR); Bumjun Kim, Suwon-si (KR); Hyunglae Eun, Suwon-si (KR); Jongwook Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/973,875

(22) Filed: Dec. 9, 2024

(65) Prior Publication Data

US 2025/0328465 A1 Oct. 23, 2025

(30) Foreign Application Priority Data

Apr. 23, 2024 (KR) ........................ 10-2024-0053898

(51) Int. Cl.
*G06F 12/02* (2006.01)

(52) U.S. Cl.
CPC ................................ *G06F 12/0246* (2013.01)

(58) Field of Classification Search
None
See application file for complete search history.

(56) References Cited

U.S. PATENT DOCUMENTS

| | | | | |
|---|---|---|---|---|
| 8,631,150 | B2 * | 1/2014 | Krithivas | G06F 3/0659 709/224 |
| 9,336,135 | B1 | 5/2016 | Salessi et al. | |
| 10,002,649 | B1 * | 6/2018 | Golan | G11C 16/10 |
| 11,073,897 | B2 | 7/2021 | Rowley | |
| 11,137,994 | B2 * | 10/2021 | Ladkani | G06F 13/4282 |
| 11,860,714 | B1 * | 1/2024 | Weinberg | G06F 11/1096 |
| 2009/0057862 | A1 * | 3/2009 | Ha | H01L 25/03 438/109 |
| 2013/0205063 | A1 * | 8/2013 | Zhang | G06F 11/1451 711/E12.008 |

(Continued)

FOREIGN PATENT DOCUMENTS

| | | |
|---|---|---|
| CN | 109598155 A | 4/2019 |
| CN | 110147243 A | 8/2019 |
| CN | 111858226 A | 10/2020 |

*Primary Examiner* — Yaima Rigol
(74) *Attorney, Agent, or Firm* — Sughrue Mion, PLLC

(57) ABSTRACT

A storage system includes a host device and a storage device that are connected to each other through a main link and a sub link. The storage device includes a nonvolatile memory device configured to store data and a storage controller package configured to control the nonvolatile memory device under control of the host device. The storage controller package includes an on-chip bus, a host interface connected to the on-chip bus and the main link, a memory interface connected to the on-chip bus and the nonvolatile memory device, a storage processor connected to the on-chip bus, and configured to perform an in-band communication with the host device through the on-chip bus, the host interface and the main link, and a microcontroller connected to the on-chip bus and the sub link, and configured to perform an out-of-band communication with the host device through the sub link.

20 Claims, 12 Drawing Sheets

(56) References Cited

U.S. PATENT DOCUMENTS

| | | | | |
|---|---|---|---|---|
| 2014/0181894 | A1* | 6/2014 | Von Bokern | H04L 63/20 726/1 |
| 2015/0149750 | A1* | 5/2015 | Maity | G06F 9/4406 713/1 |
| 2020/0341926 | A1 | 10/2020 | Tu et al. | |
| 2021/0382627 | A1* | 12/2021 | Olarig | G06F 11/3006 |
| 2021/0397577 | A1* | 12/2021 | Kahn | G06F 13/4022 |
| 2022/0261363 | A1* | 8/2022 | Confalonieri | G06F 13/1694 |
| 2023/0305972 | A1* | 9/2023 | Trantham | G06F 9/30101 |
| 2025/0004538 | A1* | 1/2025 | Montero | G06F 13/4068 |

* cited by examiner

1000

1000

500

BLKi

| Type | ID | Value | ··· | TS |
|---|---|---|---|---|
| FRU | Fan1 | 10 | ··· | 1623898043 |
| FRU | Fan2 | 20 | ··· | 1623898044 |
| FRU | Sensor1 | 99 | ··· | 1623898043 |
| | | | | |
| SSD | Read Fail | 1 | ··· | 1623898043 |
| SSD | Write Fail | 2 | ··· | 1623898043 |

STORAGE DEVICE AND STORAGE SYSTEM INCLUDING THE SAME

CROSS-REFERENCE TO RELATED APPLICATION

This U.S. non-provisional application claims priority under 35 USC § 119 to Korean Patent Application No. 10-2024-0053898, filed on Apr. 23, 2024, in the Korean Intellectual Property Office (KIPO), the disclosure of which being incorporated by reference herein in its entirety.

BACKGROUND

Example embodiments relate to semiconductor integrated circuits and, more particularly, to a storage device and a storage system configured to support out-of-band communication.

Storage devices such as solid state drives (SSDs), nonvolatile memory express (NVMe), embedded multi-media cards (eMMCs), universal flash memory (UFS), etc. are widely used.

Typically, the storage device may operate under the management of a host device. The host device is connected to the storage device by an interface, and the operating system of the host device may operate the storage device, which is an in-band management method where the host device manages the storage device. A baseboard management controller (BMC) of the host device is also connected to the storage device by an interface. The baseboard management controller communicates with the storage device without using the operating system, which is an out-of-band management method where the baseboard management controller manages the storage device.

When the transmission speed and the range of information provided by the storage device to the host device for out-of-band management are limited, the out-of-band management function of the baseboard management controller is limited and it is difficult to satisfy the needs of speed and efficient movement of information.

SUMMARY

It is an aspect to provide a storage device and a storage system, capable of efficiently providing information for out-of-band management.

According to an aspect of one or more example embodiments, there is provided a storage system comprising a host device; and a storage device connected to the host device through both a main link and a sub link. The storage device includes a nonvolatile memory device configured to store data; and a storage controller package configured to control the nonvolatile memory device based on information from the host device. The storage controller package includes an on-chip bus; a host interface connected to the on-chip bus and the main link; a memory interface connected to the on-chip bus and the nonvolatile memory device; a storage processor connected to the on-chip bus, and configured to perform an in-band communication with the host device through the on-chip bus, the host interface and the main link; and a microcontroller connected to the on-chip bus and the sub link, and configured to perform an out-of-band communication with the host device through the sub link.

According to another aspect of one or more example embodiments, there is provided a storage device comprising a nonvolatile memory device configured to store data; and a storage controller package configured to control the nonvolatile memory device based on information from a host device. The storage controller package includes an on-chip bus; a host interface connected to the on-chip bus and a main link; a memory interface connected to the on-chip bus and the nonvolatile memory device; a storage processor connected to the on-chip bus, and configured to perform an in-band communication with the host device through the on-chip bus, the host interface and the main link; and a microcontroller connected to the on-chip bus and a sub link, and configured to perform an out-of-band communication with the host device through the sub link.

According to yet another aspect of one or more example embodiments, there is provided a storage device comprising a nonvolatile memory device configured to store data; and a storage controller package configured to control the nonvolatile memory device based on information from a host device. The storage controller package includes a storage processor configured to perform an in-band communication with the host device through a main link connected to the host device; and a microcontroller configured to perform an out-of-band communication with the host device through a sub link connected to the host device.

BRIEF DESCRIPTION OF THE DRAWINGS

Various example embodiments will be more clearly understood from the following detailed description taken in conjunction with the accompanying drawings, in which.

DETAILED DESCRIPTION

Figure 1:
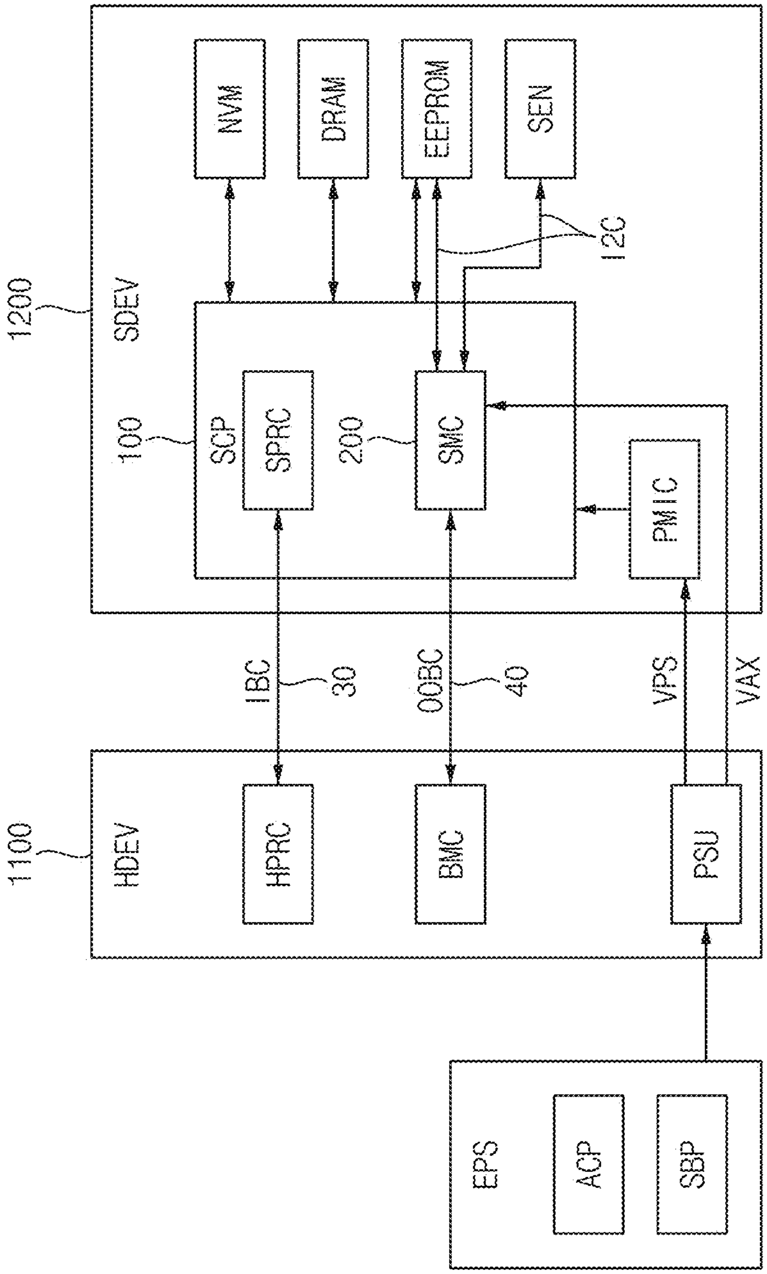
FIG. 1 is a block diagram illustrating a storage system according to example embodiments.

Various example embodiments will be described more fully hereinafter with reference to the accompanying drawings, in which some example embodiments are shown. In the drawings, like numerals refer to like elements throughout and repeated descriptions of various elements may be omitted for conciseness.

The storage device and the storage system according to various example embodiments may expand a scope of information for efficient out-of-band management and improve a speed of transfer of information by integrating a microcontroller that performs the out-of-band communications into a storage controller package. The microcontroller integrated into the storage controller package may provide high-speed access to a nonvolatile memory device and/or a volatile memory device such as a DRAM via an on-chip bus inside the storage controller package. Thus, resource consumption on the in-band communication interface may be reduced, and information to determine a cause when the storage processor fails or operates abnormally may be managed rapidly and reliably.

FIG. 1 is a block diagram illustrating a storage system according to example embodiments.

Referring to FIG. 1, a storage system 1000 may include a host device (HDEV) 1100, a storage device (SDEV) 1200, and links 30 and 40 connecting the host device (HDEV) 1100 and the storage device (SDEV) 1200.

The storage device (SDEV) 1200 may include a storage controller package (SCP) 100 and a nonvolatile memory device NVM. For example, the storage device (SDEV) 1200 may be a solid state drive (SSD), an embedded multimedia card (eMMC), a universal flash storage (UFS) device, or the like. According to example embodiments, the storage device (SDEV) 1200 may further include a power management integrated circuit PMIC, a dynamic random access memory DRAM, an electrically erasable programmable read-only memory EEPROM, sensors SEN, and the like.

The host device (HDEV) 1100 may be a data processing device capable of processing data, such as a central processing unit (CPU), an application processor, or the like. The storage device (SDEV) 1200 may be embedded in an electronic device with the host device (HDEV) 1100, or may be removably electrically connected to an electronic device including the host device (HDEV) 1100.

The host device (HDEV) 1100 may include a host processor HPRC, a baseboard management controller BMC, a power supply unit PSU, and the like. The host processor HPRC and the baseboard management controller BMC may be in communication with each other.

The power supply unit PSU may receive power from an external power supply EPS. For example, the external power supply EPS may include an alternating current power supply ACP and a standby power supply SBP. The power supply unit PSU may power the storage device (SDEV) 1200 based on power supplied from the external power supply EPS. For example, the power supply unit PSU may power the storage device (SDEV) 1200 via a main power supply voltage VPS and an auxiliary power supply voltage VAX. For example, the main power supply voltage VPS may be about 12 volts and the auxiliary power supply voltage VAX may be about 3.3 volts.

The links 30 and 40 may include a main link 30 configured to perform in-band communication IBC and a sub link 40 configured to perform out-of-band communication OOBC. In some example embodiments, the main link 30 may include a Peripheral Component Interconnect Express (PCIe) bus and the sub link 40 may include a System Management BUS (SMBUS), but example embodiments are not limited thereto.

The storage controller package (SCP) 100 may include a storage processor SPRC and a microcontroller (SMC) 200. The microcontroller (SMC) 200 may be referred to as a microcontroller unit MCU, a peripheral management unit, or a satellite management unit.

The storage processor SPRC may be coupled to the host device (HDEV) 1100 via the main link 30 and perform in-band communication IBC with the host device (HDEV) 1100 via the main link 30host device (HDEV) 1100, and the microcontroller (SMC) 200 may be coupled to the host device (HDEV) 1100 via the sub link 40 and perform out-of-band communication OOBC with the host device (HDEV) 1100 via the sub link 40host device (HDEV) 1100.

The power management integrated circuit PMIC may receive the mains power supply voltage VPS provided by the host device (HDEV) 1100 and may provide internal power supply voltages for the storage device (SDEV) 1200 based on the mains power supply voltage VPS. The power management integrated circuit PMIC may include one or more voltage regulators that convert the mains power supply voltage VPS to the internal power supply voltages.

The microcontroller (SMC) 200 may receive one of the internal power supply voltages from the power management integrated circuit PMIC or may receive the auxiliary power supply voltage VAX provided by the host device (HDEV) 1100 directly to the microcontroller (SMC) 200 and not via the power management integrated circuit PMIC, that is, bypassing the power management integrated circuit PMIC.

The EEPROM may store product information, including vital product data (VPD). The microcontroller (SMC) 200 may receive the product information from the EEPROM via an inter-integrated circuit (I2C) link and provide the product information to the host device (HDEV) 1100 through the out-of-band communication OOBC via the sub link 40. In some example embodiments, the vital product data may be stored in the EEPROM by the storage processor SPRC of the storage device (SDEV) 1200 when the storage device (SDEV) 1200 is shipped from the factory. In some example embodiments, the EEPROM may be replaced by persistent memory included in the microcontroller (SMC) 200.

The one or more sensors SEN may be integrated modules and may sense one or more parameters of the storage device (SDEV) 1200. For example, the sensors SEN may include, but are not limited to, a voltage sensor on the nonvolatile memory device NVM, a voltage sensor on the DRAM, an external voltage sensor, a temperature sensor, a humidity sensor, a current sensor, and the like. As such, the sensors SEN may provide status information including at least one of temperature information, humidity information, voltage information, or current information. The microcontroller (SMC) 200 may receive the status information from the one or more sensors SEN via the I2C link and provide the status information to the host device (HDEV) 1100 through the out-of-band communication OOBC via the sub link 40.

The control or management of the storage device (SDEV) 1200 by the host device (HDEV) 1100 may be divided into in-band management and out-of-band management.

The in-band management of the storage device (SDEV) 1200 by the host device (HDEV) 1100 represents that the host device (HDEV) 1100 performs the in-band communication IBC with the storage processor SPRC of the storage device (SDEV) 1200 through the host processor HPRC, an operating system, and the like, and operates the storage device (SDEV) 1200.

The host device (HDEV) 1100 may send data operation requests, i.e., requests and logical addresses, to the storage controller package (SCP) 100, and may send and receive data to and from the storage controller package 100. The storage controller package (SCP) 100 may send a response to the data operation request to the host device (HDEV) 1100. The data operation requests may include data read requests, data write requests, and data erase requests.

The storage controller package (SCP) 100 may control the nonvolatile memory device NVM in response to requests from the host device (HDEV) 1100. By providing the nonvolatile memory device NVM with physical addresses that is mapped to the logical addresses, command and control signals, and the like, the storage controller package (SCP) 100 may perform read operations and write operations on the nonvolatile memory device NVM. The write operations may be referred to as program operations. For example, the storage processor SPRC of the storage controller package (SCP) 100 may perform a flash translation layer (FTL) operation to convert a logical address transmitted from the host device (HDEV) 1100 to a physical address.

The nonvolatile memory device NVM may be implemented as one or more nonvolatile memories, such as flash memory, magnetic RAM (MRAM), ferroelectric RAM (FeRAM), phase change RAM (PRAM), and/or resistive RAM (ReRAM). The nonvolatile memory device NVM may be connected to the storage controller package 100 via a plurality of channels. Herein, for convenience of description, the nonvolatile memory device NVM may be exemplified and described as a NAND flash memory device.

The out-of-band management of the storage device (SDEV) 1200 by the host device (HDEV) 1100 represents that the host device (HDEV) 1100 performs the out-of-band communication OOBC with the microcontroller (SMC) 200 to collect the product information, the status information, and the like from the storage device (SDEV) 1200 via the baseboard management controller BMC or the like. The microcontroller (SMC) 200 supports telemetry functionality via the out-of-band communication OOBC.

The baseboard management controller BMC may communicate with the microcontroller (SMC) 200 of the storage device (SDEV) 1200 to obtain at least one of the product information of a storage medium in the storage device (SDEV) 1200 and the status information of the storage medium. For example, the baseboard management controller BMC may include a communication unit (not shown). The communication unit may communicate with the microcontroller (SMC) 200 of the storage device (SDEV) 1200 to obtain at least one of the product information of the storage medium of the storage device (SDEV) 1200 and the status information of the storage medium.

Subsequently, based on the information obtained from the microcontroller (SMC) 200, the baseboard management controller BMC may operate the storage device (SDEV) 1200. For example, the baseboard management controller BMC may include an operation unit (not shown). The operation unit may operate the storage device (SDEV) 1200 based on information obtained from the communication unit. In some example embodiments, the operation unit may transmit information to the microcontroller (SMC) 200 via the communication unit to actuate the storage device (SDEV) 1200 in response to information indicating that the storage device (SDEV) 1200 is in an abnormal state. The baseboard management controller BMC may control the operation of the storage device (SDEV) 1200 based on the information received from the microcontroller (SMC) 200, thereby enhancing management capabilities (e.g., out-of-band management capabilities) of the storage device (SDEV) 1200 by the baseboard management controller BMC.

In some example embodiments, the baseboard management controller BMC may transmit the information obtained from the microcontroller (SMC) 200 to the host processor HPRC of the host device (HDEV) 1100, and the host processor HPRC may determine, based on the information, operation instructions for communicating with the storage device (SDEV) 1200. The baseboard management controller BMC may receive the request or the operation instruction communicated to the storage device (SDEV) 1200 from the host processor HPRC. The baseboard management controller BMC may then communicate with the microcontroller (SMC) 200 to transmit the operation instructions to the microcontroller (SMC) 200. The microcontroller (SMC) 200 may perform corresponding operations based on the received operation instructions.

In some example embodiments, the baseboard management controller BMC may determine the operation instructions for communicating with the storage device (SDEV) 1200 based on information obtained from the microcontroller (SMC) 200. The baseboard management controller BMC may communicate with the microcontroller (SMC) 200 to transmit the operation instructions to the microcontroller (SMC) 200. The microcontroller (SMC) 200 may perform corresponding operations based on the received operation instructions.

In other words, the baseboard management controller BMC may directly or indirectly control the operations of the storage device (SDEV) 1200 based on information obtained from the microcontroller (SMC) 200, thereby enhancing management capabilities (e.g., out-of-band management capabilities) for the storage device (SDEV) 1200.

In some example embodiments, the baseboard management controller BMC may, in response to information indicating that the storage device (SDEV) 1200 is in an abnormal state, transmit information to the microcontroller (SMC) 200 for operating the storage device (SDEV) 1200. The storage device (SDEV) 1200 may perform corresponding operations based on the received information to operate the storage device (SDEV) 1200. For example, the information for operating the storage device (SDEV) 1200 may be at least one of messages and commands. In other words, in some example embodiments, the baseboard management controller BMC may communicate with the microcontroller (SMC) 200 about abnormal conditions of the storage device (SDEV) 1200. Thus, the ability of the baseboard management controller BMC to control the storage device (SDEV) 1200 when the storage device (SDEV) 1200 is in an abnormal condition may be enhanced.

The out-of-band communication OOBC may be implemented in various forms. In some example embodiments, the baseboard management controller BMC may be in continuous communication with the microcontroller (SMC) 200. In some example embodiments, the baseboard management controller BMC may communicate periodically or aperiodically with the microcontroller (SMC) 200.

The baseboard management controller BMC may determine whether the storage device (SDEV) 1200 is in an abnormal state in various ways. For example, the baseboard management controller BMC may determine whether the storage device (SDEV) 1200 is in an abnormal state based on signals from the host processor HPRC of the host device (HDEV) 1100, but example embodiments are not limited thereto.

The microcontroller (SMC) 200 may monitor the status information of the storage device (SDEV) 1200. As described above, the status information of the storage device (SDEV) 1200 may include, but is not limited to, at least one of voltage, humidity, temperature, current, or power status information. Further, the microcontroller (SMC) 200 may store at least one of the status information and the product information of the storage device (SDEV) 1200. As mentioned above, the product information of the storage device (SDEV) 1200 may include VPD information. For example, the VPD information may include basic information such as a serial number and model of the storage device (SDEV) 1200. The microcontroller (SMC) 200 may perform the out-of-band communication OOBC with the baseboard management controller BMC to transmit information to the baseboard management controller BMC.

The microcontroller (SMC) 200 may transmit at least one of the status information and the product information of the storage device (SDEV) 1200 to an external baseboard management controller, thereby enhancing management capabilities (e.g., out-of-band management capabilities) for the storage device (SDEV) 1200.

Figure 2:
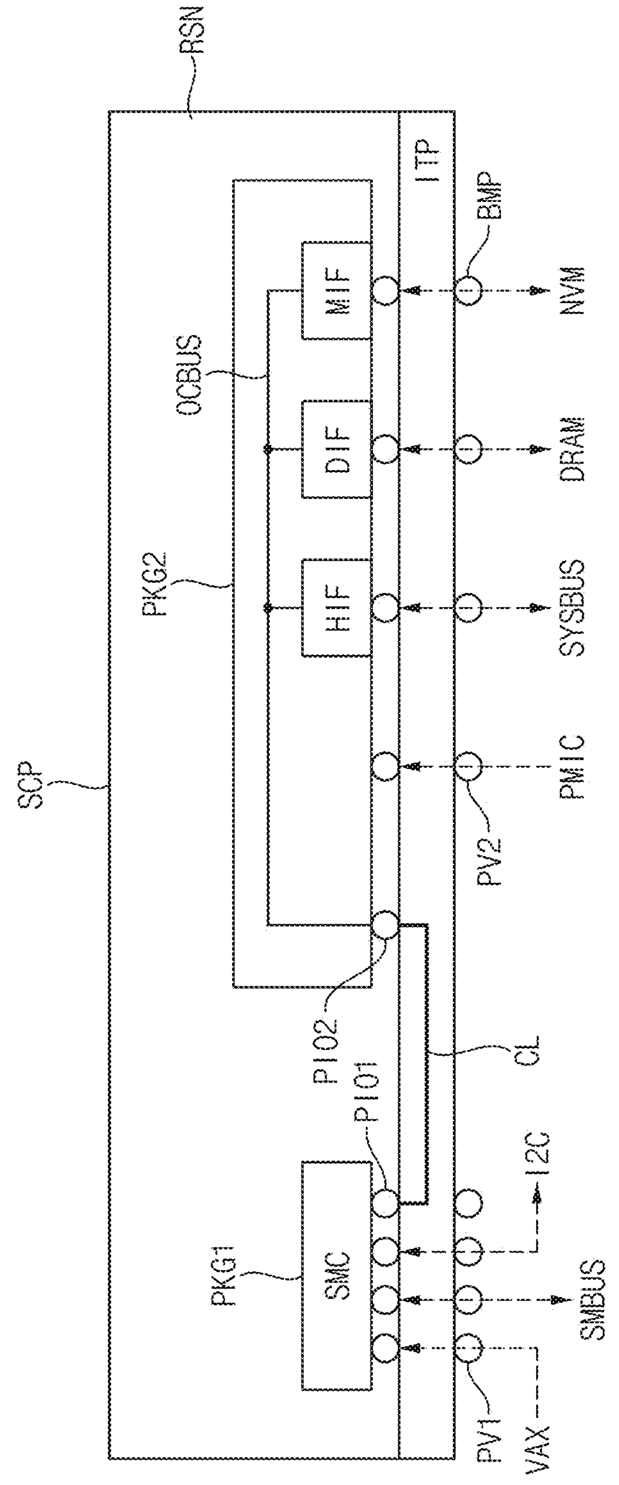
FIGS. 2 and 3 are diagrams illustrating examples of a storage controller package included in a storage device according to example embodiments.
Figure 3:
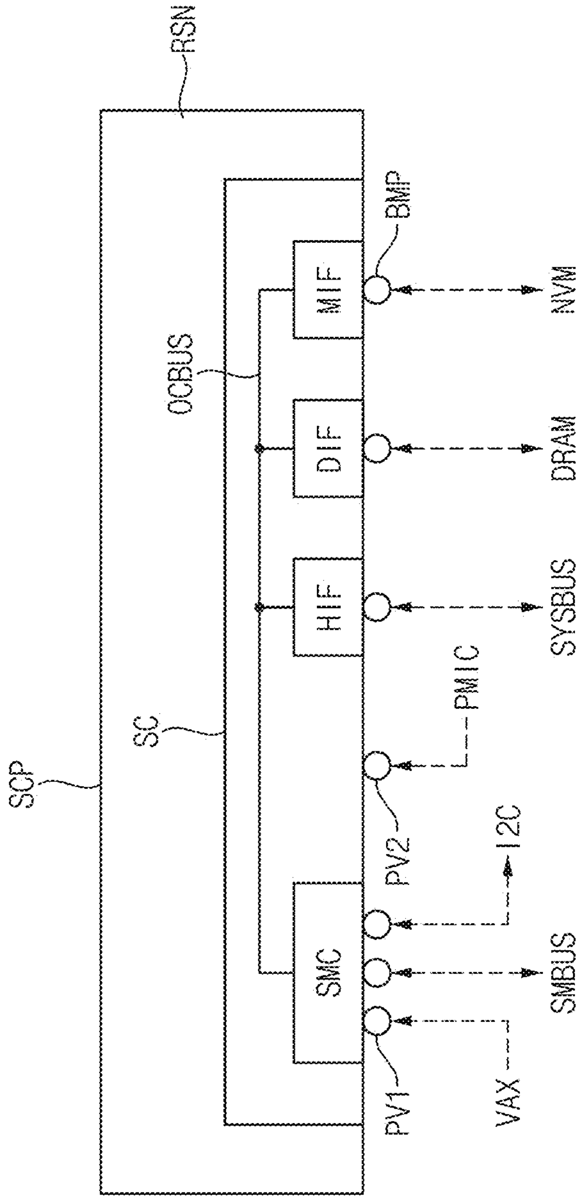

FIGS. 2 and 3 are diagrams illustrating example embodiments of a storage controller package included in a storage device according to example embodiments.

Referring to FIG. 2, a storage controller package SCP may include an interposer ITP (or a base board), a first package PKG1 stacked on the interposer ITP and a second package PKG2 stacked on the interposer ITP. The microcontroller SMC may be implemented in the first package PKG1, and the other components of the storage controller package SCP may be implemented in the second package PKG2. In other words, the microcontroller SMC may be included in the storage controller package SCP as a package-in-package structure.

In some example embodiments, the interposer ITP may be a printed circuit board (PCB). An external connection terminal, such as a conductive bump BMP, may be formed on the bottom side of the interposer ITP, and an internal connection member, such as a conductive bump BMP, may be formed on the top side of the interposer ITP. The stacked packages PKG1 and PKG2 may be packaged using a sealing member RSN.

Referring to FIGS. 1 and 2, the storage controller package SCP may include an auxiliary voltage terminal PV1 that receives an auxiliary power supply voltage VAX provided by the host device (HDEV) 1100 and a package voltage terminal PV2 that receives an internal power supply voltage provided by the power management integrated circuit PMIC. As such, the microcontroller SMC may receive the auxiliary power supply voltage VAX provided by the host device (HDEV) 1100 directly, bypassing the power management integrated circuit PMIC. The microcontroller SMC may operate based on the auxiliary power supply voltage VAX provided via the auxiliary voltage terminal PV1.

The first package PKG1 may be electrically connected to terminals for connection with the system management bus SMBUS corresponding to the sub link 40, terminals for connection with the I2C link, and the like.

The second package PKG2 may include a host interface HIF, a memory interface MIF, a DRAM interface DIF, and the like that are connected to an on-chip bus OCBUS as will be further described below with reference to FIG. 5. The second package PKG2 may be electrically connected to terminals for connection to the system bus SYSBUS corresponding to the main link 30, terminals for connection to the DRAM, terminals for connection to the nonvolatile memory device NVM, and the like.

As shown in FIG. 2, an input-output terminal PIO2 of the second package PKG2 may be connected to an input-output terminal PIO1 of the first package PKG1. The input-output terminal PIO2 may be connected to the input-output terminal PIO1 of the first package PKG1 via a conductive line CL formed in the interposer ITP. In other words, even if the microcontroller SMC is implemented in a separate package, the microcontroller SMC may be electrically connected to the on-chip bus OCBUS via the conduct line CL.

The structure of FIG. 3 is similar to that of FIG. 2, so redundant description is omitted for conciseness. Referring to FIG. 3, the microcontroller SMC may be integrated in a single semiconductor chip SC along with other components of the storage controller package SCP. In other words, the microcontroller SMC may be included in the storage controller package SCP as a core-in-package structure. In this case, the microcontroller SMC may be directly connected to the on-chip bus OCBUS.

An Open Compute Project (OCP) specification defines the embedding of a microcontroller in a storage device to support the use of the out-of-band communication OOBC in data centers, servers, etc. to support the health checks of storage devices such as SSDs, downloads of the main firmware of the storage device, and for fault analysis purposes. The required functionality of a microcontroller continues to increase.

Related art out-of-band communication is limited by the speed of communication and the information access area of the storage device, making it difficult to fulfill requirements for telemetry and debugging purposes. In the related art, microcontrollers utilize active devices such as PMICs, panel level packaging (PLP) ICs, programmable logic devices (PLDs), and Voltage Regulators (VRs) that may communicate due to physical constraints and time constraints of system operation. When microcontrollers operate in isolation, the speed of in-band communication with the storage processor, i.e., the speed of data transfer, may affect the overall performance of the storage device due to the use of serial interfaces.

By contrast, according to example embodiments, the microcontroller SMC integrated in the storage controller package SCP may share the on-chip bus OCBUS inside the storage controller package SCP to access and transfer information at high speeds. This high-speed information transfer enables information that could not otherwise be delivered due to time or data size issues, such as data about the physical location of errors that cannot be corrected by an error correction code (ECC) in DRAM or nonvolatile memory NVM, data for debugging, etc. to be delivered to the host device via the out-of-band communication OOBC.

In some example embodiments, if the nonvolatile memory device NVM or the DRAM malfunctions and the main firmware of the storage processor SPRC does not operate properly, the microcontroller's separate firmware may be utilized to determine the cause of the malfunction and correct the malfunction or restore the normal state. In some example embodiments, the microcontroller SMC included in the storage controller package SCP may be powered by the independent auxiliary voltage terminal PV2 and may communicate with the host device utilizing the out-of-band communication OOBC via the system bus SMBUS or the like even if the on-chip bus OCBUS is not operating normally.

As such, the storage device and the storage system according to various example embodiments may expand the scope of information for efficient out-of-band management and improve the speed of transfer of the information by integrating the microcontroller that performs the out-of-band communication into the storage controller package. The microcontroller integrated into the storage controller package according to various example embodiments may provide high-speed access to the nonvolatile memory device and/or the DRAM via the on-chip bus inside the storage controller package. Thus, resource consumption on the in-band communication interface may be reduced, and information to determine the cause when the storage processor fails or operates abnormally may be managed rapidly and reliably.

Figure 4:
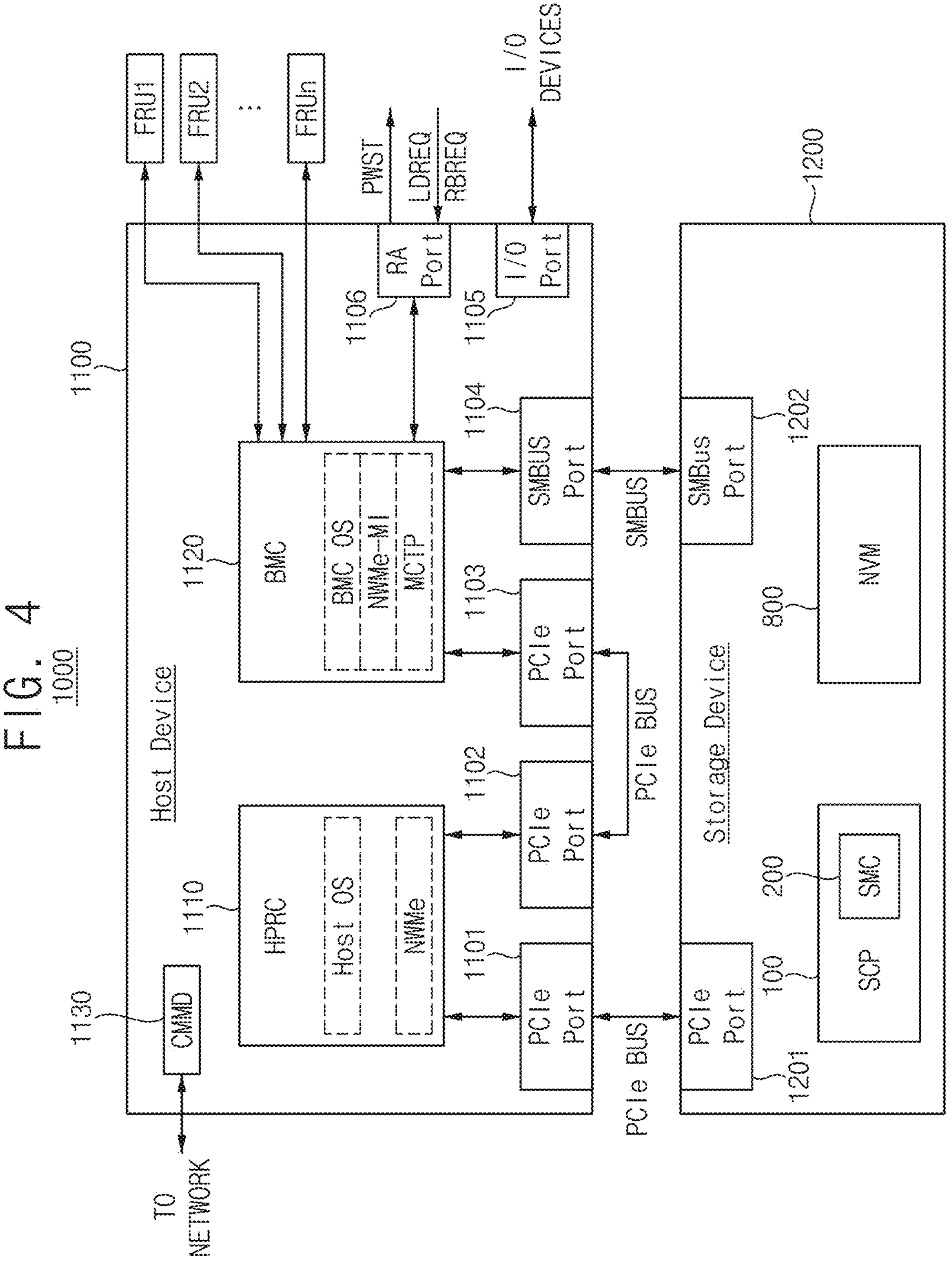
FIG. 4 is a block diagram illustrating a storage system according to example embodiments.

FIG. 4 is a block diagram illustrating a storage system according to example embodiments.

Referring to FIG. 4, a storage system 1000 may include a host device 1100 and a storage device 1200. For example, the storage system 1000 may be one of electronic devices such as a desktop computer, a laptop computer, a tablet, a smart phone, a wearable device, a video game console, a workstation, one or more servers, an electric vehicle, a home appliance, a medical device, etc.

The host device 1100 includes a host processor (HPRC) 1110, a baseboard management controller (BMC) 1120, a communication module (CMMD) 1130, PCIe ports 1101, 1102 and 1103, a system management bus (SMBUS) port 1104, an input-output port (I/O Port) 1105, and a remote access port (RA Port) 1106.

The host processor 1110 may include an application layer such as a host operating system (OS) and a protocol layer such as Nonvolatile Memory Express (NVMe). The host OS is driven by the host processor 1110 and may control the overall operation of the host device 1100. In other words the host OS is executed by the host processor 1110 and may control the overall operation of the host device 1100. The NVMe is driven by the host processor 1110 such that the host device 1100 may communicate with the storage device 1200. In other words, the NVMe is executed by the host processor 1110 such that the host device 1100 may communicate with the storage device 1200. The NVMe may be a register-level interface that governs how host software running on the host device 1100 communicates with the storage device 1200 through a PCIe (Peripheral Component Interconnect Express) bus. The host processor 1110 may be implemented as a general-purpose processor, a dedicated processor, or an application processor including one or more processor cores.

The BMC 1120 may include an application layer such as BMC OS, a protocol layer such as NVMe management interface (NVMe-MI), and a transport layer such as Management Component Transport Protocol (MCTP). The BMC OS may control the overall operation of the BMC 1120. The NVMe-MI may provide one management console that supports an in-band management function, an out-of-band management function, and various OS of the storage system 1000 that operates based on the NVMe. The MCTP may define a message transfer protocol.

The BMC 1120 may monitor the status of sensors installed in each hardware, such as the host processor 1110, a fan, and a power supply device, etc. For example, the BMC 1120 may collect data about the physical state of field replaceable units FRUs (e.g., FRU1, FRU2, . . . , FRUn) of the host device 1100 (or connected to the host device 1100). Here, the FRU may refer to a component that may be easily removed or replaced without replacing or repairing the entire storage system 1000. For example, The FRUs may include fans, various sensors, power supplies, etc. In this case, the BMC 1120 may collect data (hereinafter referred to as FRU data) regarding fan speed, temperature of each component of the host device 1100, and power supply voltage of the power supply device. The BMC 1120 and the FRUs may be connected through a system management bus SMBUS.

The BMC 1120 may provide the FRU data to the host processor 1110 through the PCIe port 1103, the PCIe bus, and the PCIe port 1102. The host processor 1110 may provide the FRU data to the storage device 1200 through the PCIe port 1101, the PCIe bus, and the PCIe port 1201. In some embodiments, the BMC 1120 may provide the FRU data to the SMBUS connected to the storage device 1200 according to a predetermined protocol.

Each of the PCIe ports 1102 and 1103 may include a physical layer and/or a logical layer configured to transmit, receive and process data, signals, and/or packets such that the host processor 1110 and the BMC 1120 may communicate with each other. Each of the PCIe ports 1101 and 1202 may include the same or similar layers such that the host processor 1110 and the storage controller package 100 may communicate with each other, and each of the SMBUS 1104 and 1202 may include the same or similar layers such that the BMC 1120 and the storage controller package 100 may communicate with each other. For example, each of the PCIe ports 1101, 1102, 1103 and 1201, and SMBUS ports 1104 and 1202 may include an NVMe management endpoint, where the NVMe management endpoint may be an MCTP endpoint.

In some embodiments, the BMC 1120 may perform a system event log function. For example, when an event occurs in which the value of data collected from a fan, power supply, etc. exceeds the threshold, and/or an event such as a request to power-on or power-off the power of the storage system 1000 occurs. The log of the occurred events may be stored in a separate memory (not shown) within the host device 1100.

Although not shown in FIG. 4, the storage system 1000 may further include a working memory and a user interface. In this case, the working memory may store data used in the operation of the storage system 1000. For example, working memory may temporarily store data collected (or processed) by BMC 1120 as well as data processed (or to be processed) by host processor 1110. For example, the working memory may be volatile memory such as Static Random Access Memory (SRAM), Dynamic RAM (DRAM), Synchronous RAM (SDRAM), and/or Phase-change RAM (PRAM), Magneto-resistive RAM (MRAM), or nonvolatile memory such as Resistive RAM (ReRAM), Ferro-electric RAM (FRAM), etc.

The communication module (CMMD) 1130 may support at least one of various wireless/wired communication protocols to communicate with an external device/system of the storage system 1000. The user interface may include various input-output interfaces to mediate communication between the user and the storage system 1000. If an uncontrollable error occurs in the operating system of the storage system 1000, communication with the management device may become impossible and the aforementioned network error may occur.

The host device 1100 may be connected to input-output devices such as a display device, keyboard, and mouse through the input-output port 1105. The display output port may be implemented as a portion of the input-output port 1105. In some embodiments, the host device 1100 may be connected to the management device through the remote access (RA) port 1106. The BMC 1120 may receive a log dump request LDREQ, a reboot request RBREQ, etc. from the management device through the remote access port 1106.

The storage device 1200 may include a storage controller package (SCP) 100 and a nonvolatile memory device (NVM) 800. The storage device 1200 may acquire the FRU data through various paths. For example, the storage device 1200 may receive the FRU data from the host processor 1110 through a PCIe bus connected to the PCIe port 1201. For example, reception of FRU data may be performed upon request from the host processor 1110. In some embodiments, the storage device 1200 may access the SMBUS connecting the SMBUS ports 1104 and 1202 when an error occurs in the storage device 1200 and obtain the FRU data from the SMBUS through the SMBUS port 1202. The storage device 1200 may store error information of the storage device 1200 itself and FRU information that may be related to an error of the host device 1100 together in the nonvolatile memory device 800. As a result, it may be easily confirmed through debugging that an error in the storage device 1200 is caused by an error in the host device 1100.

In this disclosure, it is described that the BMC 1120 and the FRUs are connected via the SMBUS, and the SMBUS port 1104 of the host device 1100 and the SMBUS port 1202 of the storage device 1200 are connected via the SMBUS, but example embodiments are not limited thereto. For example, in some embodiments, the storage device 1200 and the host device 1100 may be connected through an Inter-Integrated Circuit (I2C) bus.

According to example embodiments, a microcontroller (SMC) 200 may be integrated in the storage controller package 100. The microcontroller (SMC) 200 may provide the product information and/or the status information as described above to the host device 1100 via the out-of-band communication OOBC over the SMBUS. In some example embodiments, the microcontroller (SMC) 200 may be connected to the on-chip bus OCBUS as described above to access the nonvolatile memory device 800.

Figure 5:
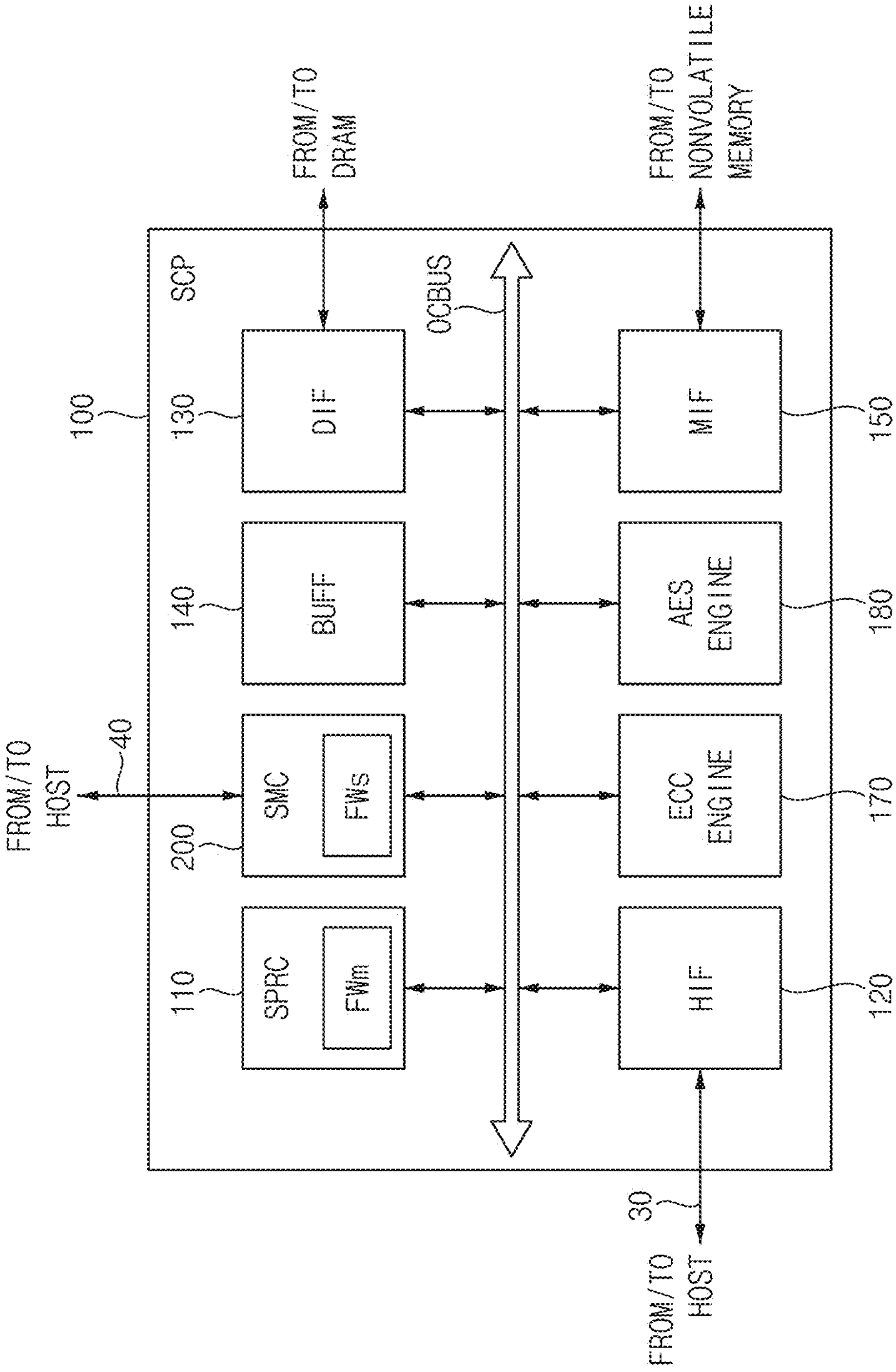
FIG. 5 is a block diagram illustrating an example of a storage controller package included in a storage device according to example embodiments.

FIG. 5 is a block diagram illustrating an example of a storage controller package included in a storage device according to example embodiments.

Referring to FIG. 5, the storage controller package (SCP) 100 may include a storage processor (SPRC) 110, a host interface (HIF) 120, a DRAM interface (DIF) 130, a buffer memory (BUFF) 140, a memory interface (MIF) 150, an error correction code (ECC) engine 170,, an advanced encryption standard (AES) engine 180, the microcontroller (SMC) 200 and the on-chip bus (OCBUS) that connects the components in the storage controller package (SCP) 100.

The storage processor (SPRC) 110 may control an operation of the storage controller package (SCP) 100 in response to commands received via the host interface 120 from a host device (e.g., the host device (HDEV) 1100 in FIG. 1). For example, the storage processor (SPRC) 110 may control an operation of a storage device (e.g., the storage device (SDEV) 1200 in FIG. 1), and may control respective components by employing firmware for operating the storage device.

The buffer memory (BUFF) 140 may store instructions and data executed and processed by the storage processor 110. For example, the buffer memory 140 may be implemented with a volatile memory, such as a DRAM, a SRAM, a cache memory, or the like.

The ECC engine 170 for error correction may perform coded modulation using a Bose-Chaudhuri-Hocquenghem (BCH) code, a low density parity check (LDPC) code, a turbo code, a Reed-Solomon code, a convolution code, a recursive systematic code (RSC), a trellis-coded modulation (TCM), a block coded modulation (BCM), or the like. In some example embodiments, the ECC engine 170 may perform ECC encoding and ECC decoding using above-described codes or other error correction codes.

The host interface (HIF) 120 may provide physical connections between the host device (HDEV) 1100 and the storage device (SDEV) 1200. The host interface 120 may provide an interface that corresponds to a bus format of the host device (HDEV) 1100 for communication between the host device (HDEV) 1100 and the storage device (SDEV) 1200. In some example embodiments, the bus format of the host device (HDEV) 1100 may be a small computer system interface (SCSI) or a serial attached SCSI (SAS) interface. In other example embodiments, the bus format of the host device may be a USB, a PCIe, an advanced technology attachment (ATA), a parallel ATA (PATA), a SATA, a non-volatile memory (NVM) express (NVMe), or other format.

The memory interface (MIF) 150 may exchange data with a nonvolatile memory device (e.g., the nonvolatile memory device NVM in FIG. 1). The memory interface 150 may transfer data to the nonvolatile memory device NVM, and/or may receive data read from the nonvolatile memory device NVM. The memory interface 150 may be configured to comply with a standard protocol, such as Toggle or open NAND flash interface (ONFI).

The DRAM interface (DIF) 130 may exchange data with a DRAM external to the storage controller package 100 (e.g., the DRAM of FIG. 1). The DRAM interface 130 may send write data to the DRAM and receive read data from the DRAM. For example, the DRAM interface 130 may be implemented to comply with standard specifications such as high bandwidth memory (HBM), low power double data rate (LPDDR), etc.

The AES engine 180 may perform at least one of an encryption operation or a decryption operation on data input to the storage controller package 100 using a symmetric-key algorithm. The AES engine 180 may include an encryption module and/or a decryption module. For example, in some example embodiments, the encryption module and the decryption module may be implemented as separate modules. In some example embodiments, one module capable of performing both encryption and decryption operations may be implemented in the AES engine 180.

The storage processor (SPRC) 110 and the microcontroller (SMC) 200 may operate independently of each other based on their respective firmware. The storage processor (SPRC) 110 may operate based on a main firmware FWm and the microcontroller (SMC) 200 may operate based on a separate firmware FWs.

The storage processor (SPRC) 110 may be connected to the on-chip bus OCBUS and may perform in-band communication with the host device via the on-chip bus OCBUS, the host interface (HIF) 120, and the main link 30.

The microcontroller (SMC) 200 may be connected to the on-chip bus OCBUS and the sub-link 40, and may perform out-of-band communication with the host device via the sub link 40.

The microcontroller (SMC) 200 may access the nonvolatile memory device NVM via the on-chip bus OCBUS and memory interface (MIF) 150 regardless of the operation of the storage processor (SPRC) 110. The microcontroller (SMC) 200 may access the DRAM via the on-chip bus OCBUS and DRAM interface 130, regardless of the operation of the storage processor.

When the main firmware FWm of the storage processor 110 fails to operate properly due to the malfunction of the nonvolatile memory device NVM or the DRAM, the separate firmware FWs of the microcontroller (SMC) 200 may be utilized to determine the cause of the failure and correct the malfunction or restore normal operation. The microcontroller (SMC) 200 included in the storage controller package 100 may be powered by an independent auxiliary voltage terminal PV2 as described with reference to FIGS. 2 and 3, and may communicate with the host device utilizing the out-of-band communication via the SMBUS or the like even if the on-chip bus OCBUS is not functioning normally.

Figure 6:
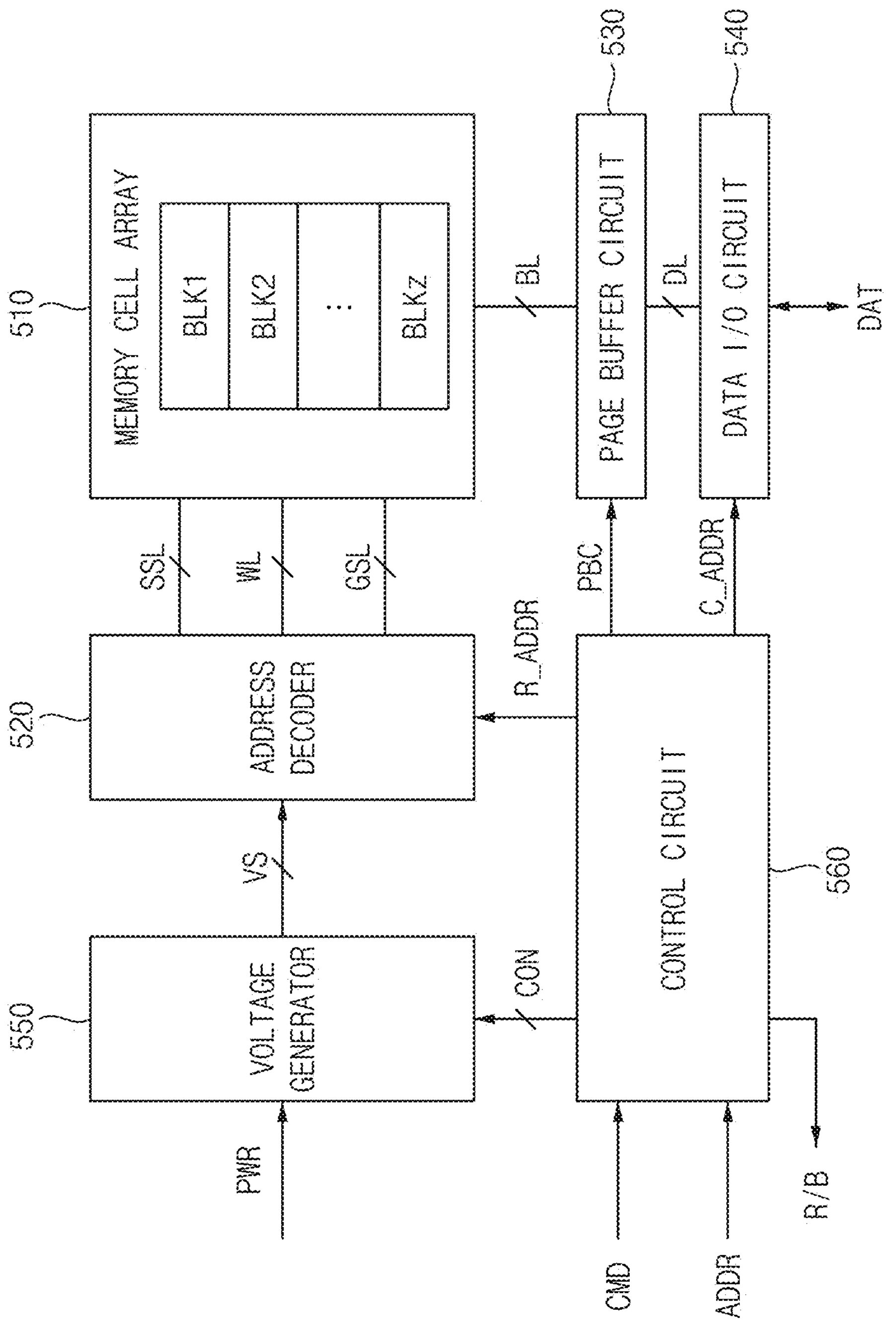
FIG. 6 is a block diagram illustrating an example of a nonvolatile memory device included in a storage device according to example embodiments.

FIG. 6 is a block diagram illustrating an example of a nonvolatile memory device included in a storage device according to example embodiments.

Referring to FIG. 6, a nonvolatile memory 500 includes a memory cell array 510, an address decoder 520, a page buffer circuit 530, a data input/output (I/O) circuit 540, a voltage generator 550, and a control circuit 560.

The memory cell array 510 is connected to the address decoder 520 via a plurality of string selection lines SSL, a plurality of wordlines WL and a plurality of ground selection lines GSL. The memory cell array 510 is further connected to the page buffer circuit 530 via a plurality of bitlines BL. The memory cell array 510 may include a plurality of memory cells (e.g., a plurality of nonvolatile memory cells) that are connected to the plurality of wordlines WL and the plurality of bitlines BL. The memory cell array 510 may be divided into a plurality of memory blocks BLK1, BLK2, . . . , BLKz, each of which includes memory cells. In addition, each of the plurality of memory blocks BLK1, BLK2, . . . , BLKz may be divided into a plurality of pages.

In some example embodiments, the plurality of memory cells included in the memory cell array 510 may be arranged in a two-dimensional (2D) array structure or a three-dimensional (3D) vertical array structure. The memory cell array of the 3D vertical array structure will be described below with reference to FIG. 8.

The control circuit 560 receives a command CMD and an address ADDR from an outside (e.g., from the storage controller package (SCP) 100 in FIG. 5), and controls an erase operation, a write operation and a read operation of the nonvolatile memory 500 based on the command CMD and the address ADDR. The write operation may include performing a sequence of program loops, and the erase operation may include performing a sequence of erase loops. Each program loop may include a program operation and a program verification operation. Each erase loop may include an erase operation and an erase verification operation. The read operation may include a normal read operation and data recover read operation.

For example, the control circuit 560 may generate control signals CON, which are used for controlling the voltage generator 550, and may generate control signal PBC for controlling the page buffer circuit 530, based on the command CMD, and may generate a row address R_ADDR and a column address C_ADDR based on the address ADDR. The control circuit 560 may provide the row address R_ADDR to the address decoder 520 and may provide the column address C_ADDR to the data I/O circuit 540.

The address decoder 520 may be connected to the memory cell array 510 via the plurality of string selection lines SSL, the plurality of wordlines WL and the plurality of ground selection lines GSL.

For example, in the data erase/write/read operations, the address decoder 520 may determine at least one of the plurality of wordlines WL as a selected wordline, and may determine the remaining wordlines, other than the selected wordline, as unselected wordlines, based on the row address R_ADDR.

In the data erase/write/read operations, the address decoder 520 may determine at least one of the plurality of string selection lines SSL as a selected string selection line, and may determine the remaining string selection lines, other than the selected string selection line, as unselected string selection lines, based on the row address R_ADDR.

In the data erase/write/read operations, the address decoder 520 may determine at least one of the plurality of ground selection lines GSL as a selected ground selection line, and may determine the remaining ground selection lines, other than the selected ground selection line, as unselected ground selection lines, based on the row address R_ADDR.

The voltage generator 550 may generate voltages VS that are required for an operation of the nonvolatile memory 500 based on a power PWR and the control signals CON. The voltages VS may be applied to the plurality of string selection lines SSL, the plurality of wordlines WL and the plurality of ground selection lines GSL via the address decoder 520. The voltage generator 550 may generate an erase voltage that is required for the data erase operation based on the power PWR and the control signals CON. The erase voltage may be applied to the memory cell array 510 directly or via the bitline BL.

For example, during the erase operation, the voltage generator 550 may apply the erase voltage to a common source line and/or the bitline BL of a memory block (e.g., a selected memory block) and may apply an erase permission voltage (e.g., a ground voltage) to all wordlines of the memory block or a portion of the wordlines via the address decoder 520. During the erase verification operation, the voltage generator 550 may apply an erase verification voltage simultaneously to all wordlines of the memory block or sequentially to the wordlines one by one.

For example, during the program operation, the voltage generator 550 may apply a program voltage to the selected wordline and may apply a program pass voltage to the unselected wordlines via the address decoder 520. During the program verification operation, the voltage generator 550 may apply a program verification voltage to the selected wordline and may apply a verification pass voltage to the unselected wordlines via the address decoder 520.

During the normal read operation, the voltage generator 550 may apply a read voltage to the selected wordline and may apply a read pass voltage to the unselected wordlines via the address decoder 520. During the data recover read operation, the voltage generator 550 may apply the read voltage to a wordline adjacent to the selected wordline and may apply a recover read voltage to the selected wordline via the address decoder 520.

The page buffer circuit 530 may be connected to the memory cell array 510 via the plurality of bitlines BL. The page buffer circuit 530 may include a plurality of page buffers. In some example embodiments, each page buffer may be connected to one bitline. In other example embodiments, each page buffer may be connected to two or more bitlines.

The page buffer circuit 530 may store data DAT to be programmed into the memory cell array 510 or may read data DAT sensed (i.e., read) from the memory cell array 510. In this regard, the page buffer circuit 530 may operate as a write driver or a sensing amplifier according to an operation mode of the nonvolatile memory 500.

The data input/output (I/O) circuit 540 may be connected to the page buffer circuit 530 via data lines DL. The data I/O circuit 540 may provide the data DAT from the outside of the nonvolatile memory 500 to the memory cell array 510 via the page buffer circuit 530 or may provide the data DAT from the memory cell array 510 to the outside of the nonvolatile memory 500, based on the column address C_ADDR.

Although the nonvolatile memory is described based on a NAND flash memory, example embodiments are not limited thereto, and in some example embodiments, the nonvolatile memory may be any nonvolatile memory, e.g., a phase random access memory (PRAM), a resistive random access memory (RRAM), a nano floating gate memory (NFGM), a polymer random access memory (PoRAM), a magnetic random access memory (MRAM), a ferroelectric random access memory (FRAM), a thyristor random access memory (TRAM), or the like.

Figure 7:
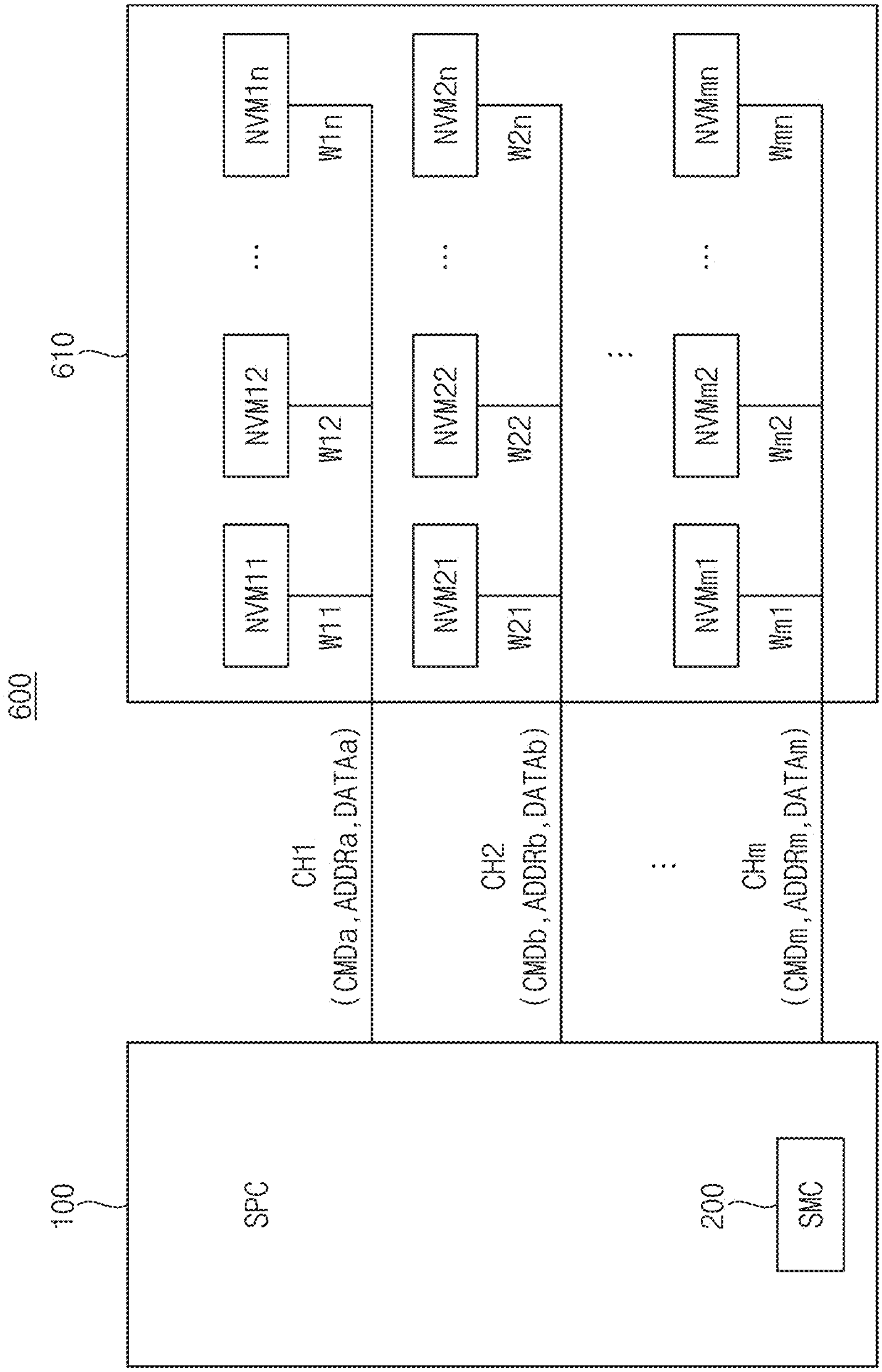
FIG. 7 is a block diagram illustrating a storage device according to example embodiments.

FIG. 7 is a block diagram illustrating a storage device according to example embodiments.

Referring to FIG. 7, a storage device 600 may include a nonvolatile memory device 610 and the storage controller package (SCP) 100. The storage device 600 may support a plurality of channels CH1, CH2, . . . , CHm, and nonvolatile the memory device 610 may be connected to the storage controller package 100 through the plurality of channels CH1 to CHm. For example, the storage device 600 may be implemented as a universal flash storage (UFS), a solid state drive (SSD), or the like. The storage device 600 may correspond to the storage device (SDEV) 1200 of FIG. 1.

The nonvolatile memory device 610 may include a plurality of nonvolatile memories NVM11, NVM12, . . . , NVM1*n*, NVM21, NVM22, . . . , NVM2*n*, NVMm1, NVMm2, . . . , NVMmn. Here, n and m may each be integers. Each of the nonvolatile memories NVM11 to NVMmn may be connected to one of the plurality of channels CH1 to CHm through a way corresponding thereto. For example, the nonvolatile memories NVM11 to NVM1*n* may be connected to the first channel CH1 through ways W11, W12, . . . , W1*n*, the nonvolatile memories NVM21 to NVM2*n* may be connected to the second channel CH2 through ways W21, W22, . . . , W2*n*, and the nonvolatile memories NVMm1 to NVMmn may be connected to the m-th channel CHm through ways Wm1, Wm2, . . . , Wmn. In some example embodiments, each of the nonvolatile memories NVM11 to NVMmn may be implemented as a memory unit that may operate according to an individual command from the storage controller package 100. For example, each of the nonvolatile memories NVM11 to NVMmn may be implemented as a chip or a die, but example embodiments are not limited thereto.

The storage controller package (SCP) 100 may transmit and receive signals to and from the nonvolatile memory device 610 through the plurality of channels CH1 to CHm. For example, the storage controller package 100 may transmit commands CMDa, CMDb, . . . , CMDm, addresses ADDRa, ADDRb, . . . , ADDRm and data DATAa, DATAb, . . . , DATAm to the nonvolatile memory device 610 through the channels CH1 to CHm, or may receive the data DATAa to DATAm from the nonvolatile memory device 610 through the channels CH1 to CHm.

The storage controller package (SCP) 100 may select one of the nonvolatile memories NVM11 to NVMmn, which is connected to each of the channels CH1 to CHm, using a corresponding one of the channels CH1 to CHm, and may transmit and receive signals to and from the selected nonvolatile memory. For example, the storage controller package 100 may select the nonvolatile memory NVM11 from among the nonvolatile memories NVM11 to NVMIn connected to the first channel CH1. The storage controller package 100 may transmit the command CMDa, the address ADDRa and the data DATAa to the selected nonvolatile memory NVM11 through the first channel CH1 or may receive the data DATAa from the selected nonvolatile memory NVM11 through the first channel CH1.

The storage controller package (SCP) 100 may transmit and receive signals to and from the nonvolatile memory device 610 in parallel through different channels. For example, the storage controller package 100 may transmit the command CMDb to the nonvolatile memory device 610 through the second channel CH2 while transmitting the command CMDa to the nonvolatile memory device 610 through the first channel CH1. For example, the storage controller package 100 may receive the data DATAb from the nonvolatile memory device 610 through the second channel CH2 while receiving the data DATAa from the nonvolatile memory device 610 through the first channel CH1.

The storage controller package (SCP) 100 may control overall operations of the nonvolatile memory device 610. The storage controller package 100 may transmit a signal to the channels CH1 to CHm and may control each of the nonvolatile memories NVM11 to NVMmn connected to the channels CH1 to CHm. For example, the storage controller package 100 may transmit the command CMDa and the address ADDRa to the first channel CH1 and may control one selected from among the nonvolatile memories NVM11 to NVM1*n*.

Each of the nonvolatile memories NVM11 to NVMmn may operate under the control of the storage controller package 100. For example, the nonvolatile memory NVM11 may program the data DATAa based on the command CMDa, the address ADDRa and the data DATAa provided from the storage controller package 100 through the first channel CH1. For example, the nonvolatile memory NVM21 may read the data DATAb based on the command CMDb and the address ADDRb provided from the storage controller package 100 through the second channel CH2 and may transmit the read data DATAb to the storage controller package 100 through the second channel CH2.

Although FIG. 7 illustrates an example where the nonvolatile memory device 610 communicates with the storage controller package (SCP) 100 through m channels and includes n nonvolatile memories corresponding to each of the channels, example embodiments are not limited thereto and the number of channels and the number of nonvolatile memories connected to one channel may be variously changed.

According to example embodiments, the microcontroller (SMC) 200 may be integrated together within the storage controller package (SCP) 100 as described above. The microcontroller (SMC) 200 may provide the product information and/or the status information, as described above, to the host device (HDEV) 1100 via the out-of-band communication OOBC over the SMBUS. In some example embodiments, the microcontroller (SMC) 200 may be connected to the on-chip bus OCBUS as described above to access the nonvolatile memory device 610.

Figure 8:
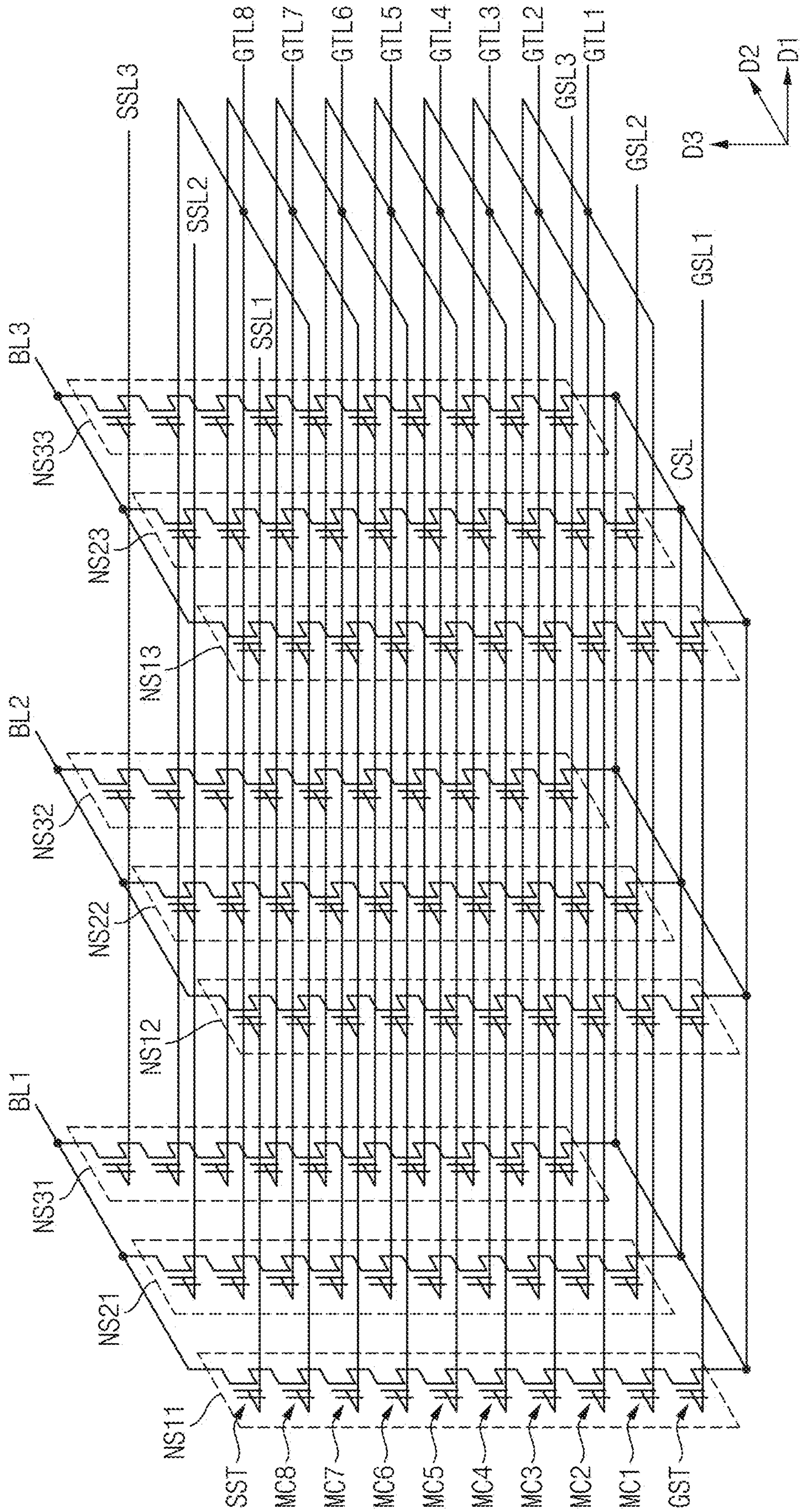
FIG. 8 is a diagram illustrating an equivalent circuit of a nonvolatile memory device included in a storage device according to example embodiments.

FIG. 8 is a diagram illustrating an equivalent circuit of a nonvolatile memory device included in a storage device according to example embodiments.

Referring to FIG. 8, each memory block BLKi included in a memory cell array may be formed on a substrate in a three-dimensional structure (or a vertical structure). For example, NAND strings or cell strings included in the memory block BLKi may be formed in a vertical direction D3 perpendicular to an upper surface of a substrate. A first direction D1 and a second direction D2 are parallel to the upper surface of the substrate.

The memory block BLKi may include NAND strings NS11 to NS33 coupled between bitlines BL1, BL2, and BL3 and a common source line CSL. Each of the NAND strings NS11 to NS33 may include a string selection transistor SST, a memory cells MC1 to MC8, and a ground selection transistor GST. In FIG. 8, each of the NAND strings NS11 to NS33 is illustrated to include eight memory cells MC1 to MC8. However, example embodiments are not limited thereto, and in some example embodiments, each of the NAND strings NS11 to NS33 may include various numbers of memory cells.

Each string selection transistor SST may be connected to a corresponding string selection line (one of SSL1 to SSL3). The memory cells MC1 to MC8 may be connected to corresponding gate lines GTL1 to GTL8, respectively. The gate lines GTL1 to GTL8 may be wordlines, and some of the gate lines GTL1 to GTL8 may be dummy wordlines. Each ground selection transistor GST may be connected to a corresponding ground selection line (one of GSL1 to GSL3). Each string selection transistor SST may be connected to a corresponding bitline (e.g., one of BL1, BL2, and BL3), and each ground selection transistor GST may be connected to the common source line CSL.

Wordlines (e.g., WL1) having the same height may be commonly connected, the ground selection lines GSL1 to GSL3 may be separated, and the string selection lines SSL1 to SSL3 may be separated. In FIG. 8, the memory block BLKi is illustrated as being coupled to eight gate lines GTL1 to GTL8 and three bitlines BL1 to BL3. However, example embodiments are not limited thereto, and in some example embodiments, each memory block in the memory cell array 510 may be coupled to various numbers of wordlines and various numbers of bitlines.

Figure 9:
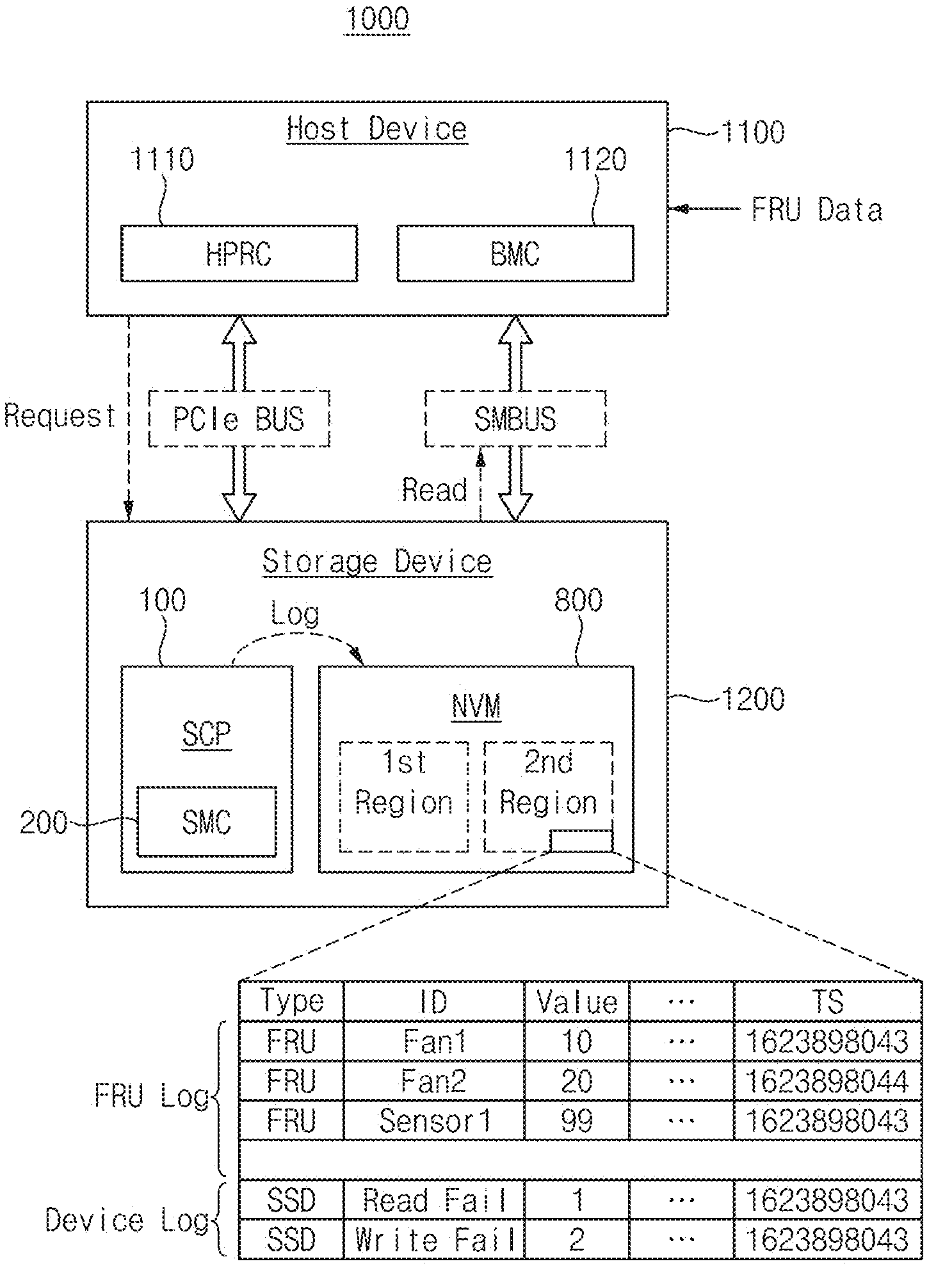
FIG. 9 is a diagram illustrating an example operation of a storage system of FIG. 4, according to example embodiments.

FIG. 9 is a diagram illustrating an example operation of the storage system of FIG. 4, according to some example embodiments.

The BMC 1120 of the host device 1100 may obtain the FRU data from the FRUs. For example, the FRUs may include a fan that dissipates heat of the host device 1100, a temperature sensor that measures the internal temperature of the host device 1100, a power supply device that supplies power to the host device 1100, etc. The FRU data may include information about the vendor, type, and status (specific value) of the FRU device. For example, if the FRU is a fan, the FRU data obtained from the fan may include the manufacturer of the fan, the value indicating that the FRU is a fan, the speed (RPM) of the fan, etc.

The BMC 1120 may perform processing to add information about the occurrence time (e.g., a timestamp) to the acquired FRU data. The BMC 1120 may transmit the processed FRU data to the host processor 1110 through a bus (e.g., PCIe bus) inside the host device 1100. In some example embodiments, the BMC 1120 may transmit the processed FRU data to the SMBUS connected to storage device 1200. In some example embodiments, the BMC 1120 may store the FRU data in a separate memory device within host device 1100.

In some example embodiments, when a performance abnormality (or performance degradation) is detected in the storage device 1200, the host device 1100 may transmit a request (i.e., the log dump request) to the storage device 1200. Here, the request may be a request to store information related to an error of the storage device 1200 (i.e., device log) in a second area, which may be set to be distinct from a first area where user data is stored.

The storage device 1200 may read data from the SMBUS connected to the host device 1100 in response to a request from the host device 1100. The BMC 1120 may flow the FRU data to the SMBUS according to a predetermined SMBUS protocol, and the storage device 1200 may obtain the FRU data from the SMBUS connected to the host device 1100. For example, the FRU data may include a device type (e.g., a value indicating that it is a FRU), an identifier (ID) (e.g., a value indicating the type of FRU), a value that may confirm that there is a problem with the FRU, a time stamp TS (e.g., the occurrence time of the value), etc.

The storage device 1200 may generate a log dump command in response to a request from the host device 1100. The log dump command may be related to storing the FRU data obtained from the SMBUS (i.e., FRU log) and the device log related to errors in the storage device 1200 in the second area of the nonvolatile memory device 800. For example, a device log may include the device type (e.g., a value indicating that it is a storage device (e.g. SSD)), an identifier (ID) (e.g., the number of the storage device), a value that identifies a problem with the storage device, and a timestamp TS, etc.

The nonvolatile memory device 800 may store the FRU data and device logs in the second area of the nonvolatile memory device 800 in response to the log dump command.

In some example embodiments, when it is confirmed that there is a problem with the FRU, the host device 1100 may transmit a request to the storage device 1200. Here, the request may be a request to store information (e.g., the FRU data) related to an error of the host device 1100 in the storage device 1200.

The BMC 1120 may confirm that there is a problem with the FRU based on whether the FRU data obtained from the FRU is within a reference range, below a reference value, or exceeds a reference value. The BMC 1120 may transmit a signal indicating that there is a problem with the FRU to the host processor 1110 according to the verification result. In some example embodiments, the host processor 1110 may determine whether the FRU data received from the BMC 1120 is within the reference range, below the reference value, or exceeds the reference value. Based on this determination, it may be confirmed that there is a problem with the FRU.

If it is confirmed that there is an error in the FRU data, the host processor 1110 may transmit a request to the storage device 1200. For example, the request from the host device 1100 may include storing the FRU data in the storage device 1200 in addition to requesting a log dump. Accordingly, the request from the host device 1100 may involve transferring the FRU data to the storage device 1200 through the PCIe bus.

The storage controller package (SCP) 100 may generate a log dump command in response to a request from the host device 1100. The log dump command may be a command for storing the FRU data and device logs received through the PCIe bus in the second area of the nonvolatile memory device 800. The nonvolatile memory device 800 may store the FRU data and/or device logs in the second area of the nonvolatile memory device 800 in response to the log dump command.

In some example embodiments, when it is confirmed that there is a problem with the FRU, the host device 1100 may transmit a request to the storage device 1200. Here, the request may be a request notifying that there is an error in the host device 1100. That is, the request is a simple notification that there is an error in the host device 1100, and the storage device 1200 may obtain the FRU data through a path different from the path through which the request is received (i.e., PCIe bus). For example, the storage device 1200 may obtain the FRU data by reading data from the SMBUS connected to the host device 1100 in response to a request from the host device 1100.

The storage device 1200 may generate a log dump command in response to a request from the host device 1100. The log dump command may be related to storing the FRU data obtained from the SMBUS (i.e., FRU log) and a device log related to errors in the storage device 1200 in the second area of the nonvolatile memory device 800.

According to example embodiments, the microcontroller (SMC) 200 may be integrated together within the storage controller package (SCP) 100. The microcontroller (SMC) 200 may provide the product information and/or the status information, as described above, to the host device 1100 through the out-of-band communication OOBC over the SMBUS. In some example embodiments, the microcontroller (SMC) 200 may be connected to the on-chip bus OCBUS as described above to access the nonvolatile memory device 800.

When the BMC 1120 determines that the storage processor 110 is inoperable, the BMC 1120 may send a data dump request LDREQ, a recovery request RCREQ, and the like (see FIG. 4) to the microcontroller (SMC) 200 through the out-of-band communication OOBC over the SMBUS, and the microcontroller (SMC) 200 may perform log dump operations, recovery operations, and the like, as will be further described below with reference to FIG. 11.

Figure 10:
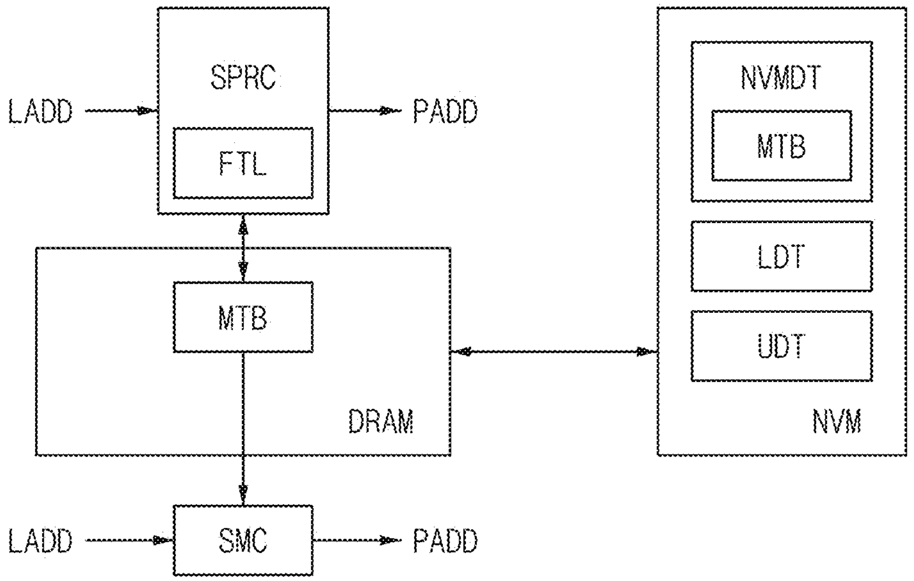
FIG. 10 is a diagram illustrating an example operation of a storage device according to example embodiments.

FIG. 10 is a diagram illustrating an example operation of a storage device according to example embodiments.

Referring to FIGS. 1 and 10, the storage area of the nonvolatile memory device NVM may be divided into areas for storing nonvolatile metadata NVMDT, log data LDT, and user data LDT, respectively. It is noted that metadata stored in the nonvolatile memory device NVM may be referred to as the nonvolatile metadata NVMDT, and the metadata stored in the storage controller package (SCP) 100 may be referred to as firmware metadata.

Nonvolatile metadata NVMDT is distinct from user data, which is stored in the nonvolatile memory device NVM at the request of the host device (HDEV) 1100, and is data that is generated and managed by the firmware of the storage controller package (SCP) 100 to manage the user data or the nonvolatile memory device NVM. The nonvolatile metadata NVMDT may include a mapping table MTB representing a mapping relationship between logical addresses of the host device (HDEV) 1100 and physical addresses of the nonvolatile memory NVM, and may include other information for managing the memory space of the nonvolatile memory device NVM, such as bad blocks, program-erase cycles, valid page count values, and the like.

The nonvolatile metadata NVMDT may be loaded from the nonvolatile memory device NVM during power-on of the storage system 1000 and stored as the firmware metadata in memory of the storage controller package (SCP) 100, such as volatile memory such as DRAM or SRAM. The firmware metadata may change during operation of the storage device (SDEV) 1200, and journaling techniques may be utilized to maintain consistency between the firmware metadata and the nonvolatile metadata NVMDT.

The storage processor SPRC of the storage controller package 100 may perform a flash translation layer FTL to translate logical addresses LADD transmitted from the host device (HDEV) 1100 into physical addresses PADD. The flash translation layer FTL may create and manage a mapping table MTB that represents a mapping relationship between logical addresses LADD and physical addresses PADD. The microcontroller SMC of the storage controller package 100 may refer to the mapping table MTB to translate logical addresses LADD to physical addresses PADD to perform access to nonvolatile memory devices NVM.

Figure 11:
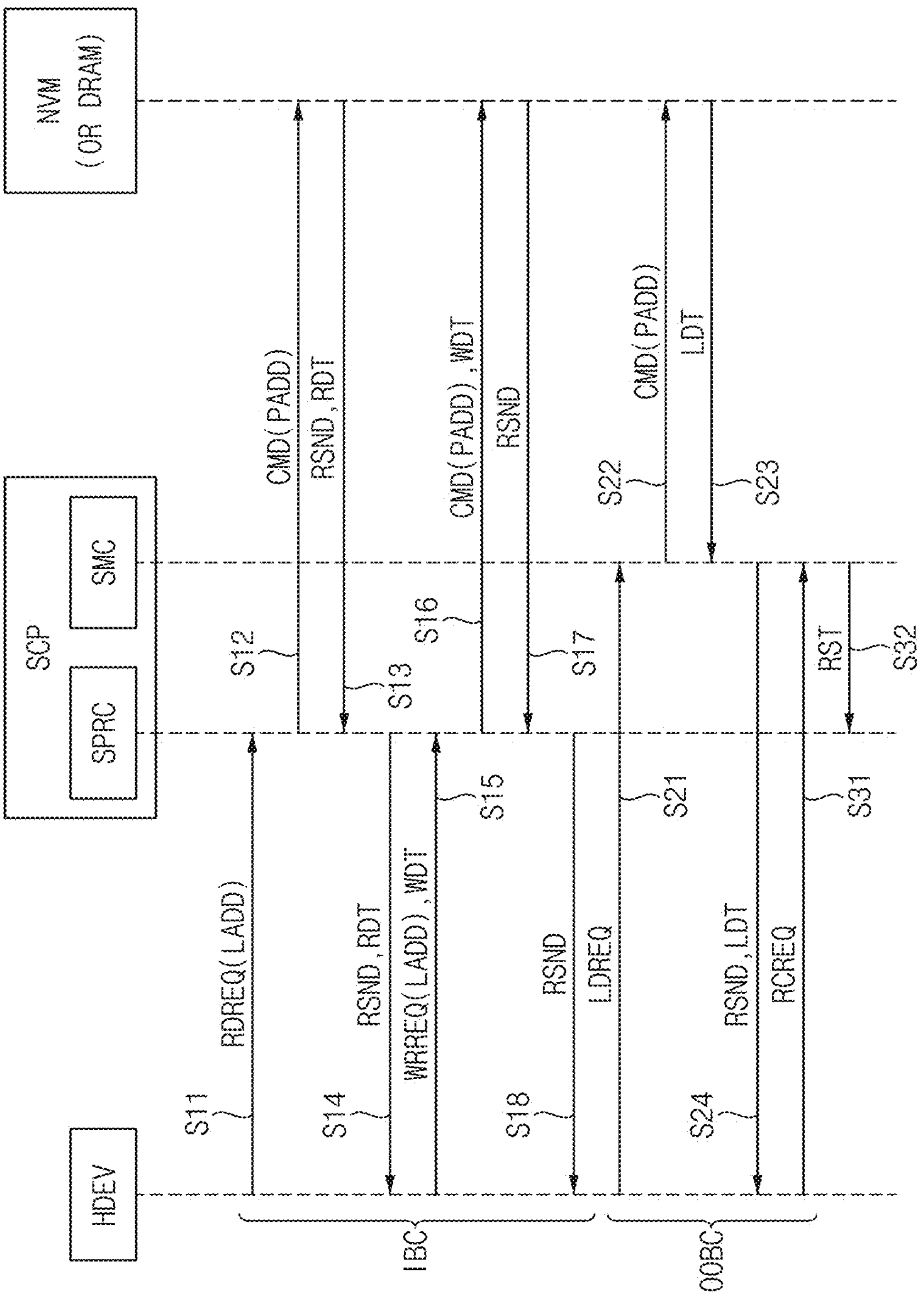
FIG. 11 is a diagram illustrating an example operation of a storage system according to example embodiments.

FIG. 11 is a diagram illustrating an example operation of a storage system according to example embodiments.

In in-band communication IBC, a host device HDEV may send a data operation request, i.e., a request and logical address, to a storage processor SPRC in a storage controller package SCP, and may send data to and from a storage controller package SPC. The storage processor SPRC may send a response to the data operation request RSND to the host device HDEV. The data operation requests may include data read requests, data write requests, and data erase requests.

The storage processor SPRC may control the nonvolatile memory device NVM in response to a request (or requests) from the host device HDEV. By providing the nonvolatile memory device NVM with physical addresses PADD that is mapped to logical addresses LADD, commands CMD, and control signals, the storage processor SPRC may perform read operations and write operations on the nonvolatile memory device NVM. The write operations may be referred to as program operations. As described above with reference to FIG. 10, the storage processor SPRC may perform the flash translation layer (FTL) to translate a logical address LADD transmitted from the host device HDEV into a physical address PADD.

For example, in the in-band communication IBC, the storage processor SPRC may receive a data read request RDREQ from the host device HDEV (S11) and transmit a command CMD corresponding to the data read request RDREQ to the nonvolatile memory device NVM (S12). When the nonvolatile memory device NVM successfully completes the read operation, the storage processor SPRC may receive a response RSND and read data RDT corresponding to the command CMD from the nonvolatile memory device NVM (S13), and may transmit the response RSND and the read data RDT corresponding to the data read request RDREQ to the host device HDEV (S14).

For example, in the in-band communication IBC, the storage processor SPRC may receive a data write request WRREQ and write data WDT from the host device HDEV (S15), and may transmit a command CMD corresponding to the data write request RDREQ and write data WDT to the nonvolatile memory device NVM (S16). When the nonvolatile memory device NVM successfully completes the write operation, the storage processor SPRC may receive a response RSND corresponding to the command CMD from the nonvolatile memory device NVM (S17), and may transmit a response RSND corresponding to the write data request WRREQ to the host device HDEV (S14).

In out-of-band communication OOBC, the host device HDEV may send a data operation request, i.e., a request, to the microcontroller SMC in the storage controller package SCP, and may send and receive data to and from the microcontroller SMC. The microcontroller SMC may send a response RSND responding to the data operation request to the host device HDEV. The data operation request may include a request to read dump data, a recovery request, etc.

For example, in the out-of-band communication OOBC, the microcontroller SMC may receive a data dump request LDREQ from the host device HDEV (S21) and transmit a command CMD corresponding to the data dump request LDREQ to the nonvolatile memory device NVM (S22). When the nonvolatile memory device NVM successfully completes the read operation, the microcontroller SMC may receive a response RSND and log data LDT corresponding to the command CMD from the nonvolatile memory device NVM (S23), and may transmit the response RSND and the log data LDT corresponding to the data dump request LDREQ to the host device HDEV (S24). The logical address LADD corresponding to the log data LDT may be provided from the host device HDEV with the data dump request LDREQ, or the logical address LADD corresponding to the storage area of the log data LDT may be pre-stored in the microcontroller SMC during the initialization of the storage device. Similarly, metadata stored in nonvolatile memory devices NVM, data stored in DRAM may be dumped to the host device HDEV via the out-of-band communication OOBC.

As such, if the storage processor SPRC is not operational, the microcontroller SMC may receive the data dump request LDREQ transmitted from the host device HDEV through the out-of-band communication OOBC via the sub link 40, read out the log data LDT stored in the nonvolatile memory device NVM via the on-chip bus OCBUS and the memory interface MIF, and transmit the log data LDT to the host device HDEV through the out-of-band communication OOBC.

For example, in the out-of-band communication OOBC, the microcontroller SMC may receive a recovery request RCREQ from the host device HDEV (S31). The host device HDEV may send the recovery request RCREQ to the microcontroller SMC when the storage processor SPRC is not operational. The microcontroller SMC may generate a signal RST to restart the firmware of the storage processor SPRC in response to the recovery request RCREQ (S32). The signal RST to restart the firmware of the processor SPRC may be a signal to trigger a reset of the storage processor SPRC, a reboot of the storage device 1100, or the like.

Figure 12:
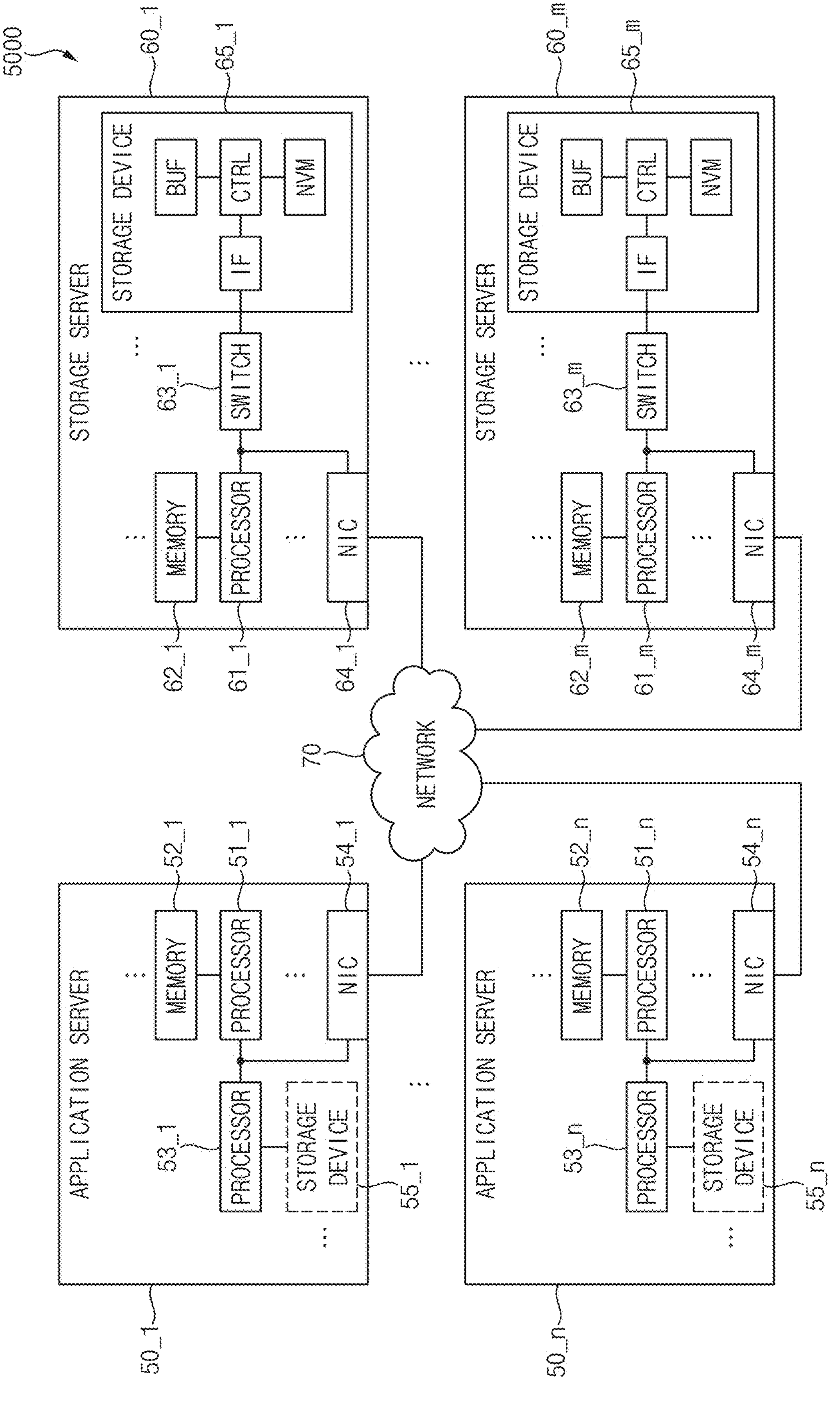
FIG. 12 is a block diagram illustrating a data center including a storage device according to example embodiments.

FIG. 12 is a block diagram illustrating a data center including a storage device according to example embodiments.

In some example embodiments, the system described above with reference to FIGS. 1-11 may serve as an application server and/or a storage server and may be included in a data center 5000.

Referring to FIG. 12, the data center 5000 may collect various pieces of data and provide services and be also referred to as a data storage center. For example, the data center 5000 may be a system configured to operate a search engine and a database or a computing system used by companies, such as banks, or government agencies. As shown in FIG. 12, the data center 5000 may include application servers 50_1 to 50_*n* and storage servers 60_1 to 60_*m* (where, each of m and n is an integer more than 1). The number n of application servers 50_1 to 50_*n* and the number m of storage servers 60_1 to 60_*m* may be variously selected according to example embodiments. In some example embodiments, the number n of application servers 50_1 to 50_*n* may be different from the number m of storage servers 60_1 to 60_*m*.

The application servers 50_1 to 50_*n* may include any one or any combination of processors 51_1 to 51_*n*, memories 52_1 to 52_*n*, switches 53_1 to 53_*n*, network interface controllers (NICs) 54_1 to 54_*n*, and storage devices 55_1 to 55_*n*. The processors 51_1 to 51_*n* may control all operations of the application servers 50_1 to 50_*n*, access the memories 52_1 to 52_*n*, and execute instructions and/or data loaded in the memories 52_1 to 52_*n*. Non-limiting examples of the memories 52_1 to 52_*n* may include DDR SDRAM, a high-bandwidth memory (HBM), a hybrid memory cube (HMC), a dual in-line memory module (DIMM), a Optane DIMM, or a nonvolatile DIMM (NVDIIMM).

According to example embodiments, the numbers of processors and memories included in the application servers 50_1 to 50_*n* may be variously selected according to example embodiments. In some example embodiments, the processors 51_1 to 51_*n* and the memories 52_1 to 52_*n* may provide processor-memory pairs. In some example embodiments, the number of processors 51_1 to 51_*n* may be different from the number of memories 52_1 to 52_*n*. The processors 51_1 to 51_*n* may include a single core processor or a multi-core processor. In some example embodiments, as illustrated with a dashed line in FIG. 12, the storage devices 55_1 to 55_*n* may be omitted from the application servers 50_1 to 50_*n*. The number of storage devices 55_1 to 55_*n* included in the storage servers 50_1 to 50_*n* may be variously selected according to example embodiments. The processors 51_1 to 51_*n*, the memories 52_1 to 52_*n*, the switches 53_1 to 53_*n*, the NICs 54_1 to 54_*n*, and/or the storage devices 55_1 to 55_*n* may communicate with each other through a link described above with reference to the drawings.

The storage servers 60_1 to 60_*m* may include any one or any combination of processors 61_1 to 61_*m*, memories 62_1 to 62_*m*, switches 63_1 to 63_*m*, network interface controllers (NICs) 64_1 to 64_*n*, and devices 65_1 to 65_*m*. The storage processors 61_1 to 61_*m* and the memories 62_1 to 62_*m* may operate similar to the processors 51_1 to 51_*n* and the memories 52_1 to 52_*n* of the application servers 50_1 to 50_*n* described above.

The application servers 50_1 to 50_*n* may communicate with the storage servers 60_1 to 60_*m* through a network 70. In some example embodiments, the network 70 may be implemented using a fiber channel (FC) or Ethernet. The FC may be a medium used for relatively high-speed data transfer. An optical switch that provides high performance and high availability may be used as the FC. The storage servers 60_1 to 60_*m* may be provided as file storages, block storages, or object storages according to an access method of the network 70.

In some example embodiments, the network 70 may be a storage-only network, such as a storage area network (SAN). For example, the SAN may be an FC-SAN, which may use an FC network and be implemented using an FC Protocol (FCP). In another case, the SAN may be an Internet protocol (IP)-SAN, which uses a transmission control protocol/Internet protocol (TCP/IP) network and is implemented according to an SCSI over TCP/IP or Internet SCSI (iSCSI) protocol. In some example embodiments, the network 70 may be a general network, such as a TCP/IP network. For example, the network 70 may be implemented according to a protocol, such as FC over Ethernet (FCOE), network attached storage (NAS), nonvolatile memory express (NVMe) over fabrics (NVMe-oF).

The application server 50_1 and the storage server 60_1 will mainly be described, but it may be noted that a description of the application server 50_1 may be also applied to another application server (e.g., 50_*n*), and a description of the storage server 60_1 may be also applied to another storage server (e.g., 60_*m*).

The application server 50_1 may store data, which is requested to be stored by a user or a client, in one of the storage servers 60_1 to 60_*m* through the network 70. In some example embodiments, the application server 50_1 may obtain data, which is requested to be read by the user or the client, from one of the storage servers 60_1 to 60_*m* through the network 70. For example, the application server 50_1 may be implemented using a web server or a database management system (DBMS).

The application server 50_1 may access the memory 52_*n* and/or the storage device 55_*n* included in another application server 50_*n*, through the network 70, and/or access the memories 62_1 to 62_*m* and/or the storage devices 65_1 to 65_*m* included in the storage servers 60_1 to 60_*m,* through the network 70. Accordingly, the application server 50_1 may perform various operations on data stored in the application servers 50_1 to 50_*n* and/or the storage servers 60_1 to 60_*m.* For example, the application server 50_1 may execute an instruction to migrate or copy data between the application servers 50_1 to 50_*n* and/or the storage servers 60_1 to 60_*m.* In this case, the data may be migrated from the storage devices 65_1 to 65_*m* of the storage servers 60_1 to 60_*m* to the memories 52_1 to 52_*n* of the application servers 50_1 to 50_*n* through the memories 62_1 to 62_*m* of the storage servers 60_1 to 60_*m* or directly. In some example embodiments, the data migrated through the network 70 may be encrypted data for security or privacy.

In the storage server 60_1, an interface IF may provide physical connection between the processor 61_1 and a controller CTRL and physical connection between the NIC 64_1 and the controller CTRL. For example, the interface IF may be implemented using a direct attached storage (DAS) method in which the storage device 65_1 is directly connected to a dedicated cable. For example, the interface IF may be implemented using various interface methods, such as advanced technology attachment (ATA), serial ATA (SATA), external SATA (e-SATA), small computer small interface (SCSI), serial attached SCSI (SAS), PCI, PCIe, NVMe, IEEE 1394, a universal serial bus (USB), a secure digital (SD) card, a multi-media card (MMC), an embedded MMC (eMMC), a UFS, an embedded UFS (eUFS), and/or a compact flash (CF) card interface.

In the storage server 60_1, the switch 63_1 may selectively connect the processor 61_1 to the storage device 65_1 or selectively connect the NIC 64_1 to the storage device 65_1 based on the control of the processor 61_1.

In some example embodiments, the network interface controller (NIC) 64_1 may include a network interface card and a network adaptor. The NIC 54_1 may be connected to the network 70 through a wired interface, a wireless interface, a Bluetooth interface, or an optical interface. The NIC 54_1 may include an internal memory, a digital signal processor (DSP), and a host bus interface and be connected to the processor 61_1 and/or the switch 63_1 through the host bus interface. In some example embodiments, the NIC 64_1 may be integrated with any one or any combination of the processor 61_1, the switch 63_1, and the storage device 65_1.

In the application servers 50_1 to 50_*n* or the storage servers 60_1 to 60_*m,* the processors 51_1 to 51_*m* and 61_1 to 61_*n* may transmit commands to the storage devices 55_1 to 55_*n* and 65_1 to 65_*m* or the memories 52_1 to 52_*n* and 62_1 to 62_*m* and program or read data. In this case, the data may be data of which an error is corrected by an error correction code (ECC) engine. The data may be data processed with data bus inversion (DBI) or data masking (DM) and include cyclic redundancy Code (CRC) information. The data may be encrypted data for security or privacy.

In response to read commands received from the processors 51_1 to 51_*m* and 61_1 to 61_*n,* the storage devices 55_1 to 55_*n* and 65_1 to 65_*m* may transmit control signals and command/address signals to a nonvolatile memory device (e.g., a NAND flash memory device) NVM. Accordingly, when data is read from the nonvolatile memory device NVM, a read enable signal may be input as a data output control signal to output the data to a DQ bus. A data strobe signal may be generated using the read enable signal. The command and the address signal may be latched according to a rising edge or falling edge of a write enable signal.

The controller CTRL may control all operations of the storage device 65_1. In example embodiments, the controller CTRL may include static RAM (SRAM). The controller CTRL may write data to the nonvolatile memory device NVM in response to a write command or read data from the nonvolatile memory device NVM in response to a read command. For example, the write command and/or the read command may be generated based on a request provided from a host (e.g., the processor 61_1 of the storage server 60_1, the processor 61_*m* of another storage server 60_*m,* or the processors 51_1 to 51_*n* of the application servers 50_1 to 50_*n*). A buffer BUF may temporarily store (or buffer) data to be written to the nonvolatile memory device NVM or data read from the nonvolatile memory device NVM. In some example embodiments, the buffer BUF may include DRAM. The buffer BUF may store metadata. The metadata may refer to user data or data generated by the controller CTRL to manage the nonvolatile memory device NVM. The storage device 65_1 may include a secure element (SE) for security or privacy.

According to example embodiments as described above, the storage devices 55_1 to 55_*n,* 65_1 to 65_*m* may include a storage controller package in which a microcontroller is integrated. The microcontroller may provide the product information and the status information as described above to the processors 61_1 to 61_*m* via out-of-band communication OOBC over the SMBUS. Additionally, the microcontroller 100 may be connected to the on-chip bus OCBUS as described above to access a nonvolatile memory device NVM.

As described above, the storage device and the storage system according to example embodiments may expand the scope of information for efficient out-of-band management and improve the speed of transfer of the information by integrating the microcontroller that performs the out-of-band communications into the storage controller package. The microcontroller integrated into the storage controller package may provide high-speed access to the nonvolatile memory device and/or the volatile memory device such as DRAM via the on-chip bus inside the storage controller package. Thus, resource consumption on the in-band communication interface may be reduced, and information to determine the cause when the storage processor fails or operates abnormally may be managed rapidly and reliably.

The various example embodiments may be applied to any electronic devices and systems including a nonvolatile memory device. For example, the various example embodiments may be applied to systems such as a memory card, a solid state drive (SSD), an embedded multimedia card (eMMC), a universal flash storage (UFS), a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IOT) device, an internet of everything (IoE) device, an e-book, a virtual reality (VR) device, an augmented reality (AR) device, a server system, an automotive driving system, etc.

The foregoing is illustrative of various example embodiments and is not to be construed as limiting thereof. Although a few example embodiments have been described, those skilled in the art will readily appreciate that many modifications are possible in the example embodiments without materially departing from the scope as defined by the appended claims.

What is claimed is:

1. A storage system comprising:

a host device; and a storage device connected to the host device through both a main link and a sub link, wherein the storage device includes:

a nonvolatile memory device configured to store data; and a storage controller package configured to control the nonvolatile memory device based on information from the host device, and wherein the storage controller package includes:

an on-chip bus;

a host interface connected to the on-chip bus and the main link;

a memory interface connected to the on-chip bus and the nonvolatile memory device;

a storage processor connected to the on-chip bus, and configured to access the nonvolatile memory device through the on-chip bus and to perform an in-band communication with the host device through the on-chip bus, the host interface and the main link; and a microcontroller connected to the on-chip bus and the sub link, and configured to access the nonvolatile memory device through the on-chip bus and to perform an out-of-band communication with the host device through the sub link.

2. The storage system of claim 1, wherein the microcontroller is included in the storage controller package as a package-in-package structure such that the microcontroller is included in a first package, other components of the storage controller package are included in a second package, and the first package and the second package are mounted on an interposer.

3. The storage system of claim 2, wherein an input-output terminal of the second package is electrically connected to an input-output terminal of the first package through a conduction line that is formed in the interposer, wherein the on-chip bus is included in the second package.

4. The storage system of claim 1, wherein the microcontroller is included in the storage controller package as a core-in-package structure such that the microcontroller is integrated in a single semiconductor chip with other components of the storage controller package.

5. The storage system of claim 1, wherein the storage device further includes:

a power management integrated circuit configured to receive a main power supply voltage from the host device and provide internal power supply voltages of the storage device based on the main power supply voltage, and wherein the microcontroller is configured to receive an auxiliary power supply voltage from the host device not via the power management integrated circuit.

6. The storage system of claim 5, wherein the storage controller package further includes:

an auxiliary voltage terminal that receives the auxiliary power supply voltage from the host device; and a package voltage terminal that receives an internal power supply voltage from the power management integrated circuit, and wherein the microcontroller is configured to operate based on the auxiliary power supply voltage that is provided through the auxiliary voltage terminal.

7. The storage system of claim 1, wherein the storage processor and the microcontroller are configured to operate independently based on respective firmware.

8. The storage system of claim 1, wherein the microcontroller is configured to access the nonvolatile memory device through the on-chip bus and the memory interface regardless of an operation of the storage processor.

9. The storage system of claim 1, wherein, the microcontroller is configured to, when the storage processor does not operate, receive a data dump request from the host device through the out-of-band communication via the sub link, read log data stored in the nonvolatile memory device through the on-chip bus and the memory interface based on the data dump request, and transfer the log data to the host device through the out-of-band communication.

10. The storage system of claim 1, wherein the microcontroller is configured to, when the storage processor does not operate, receive a recovery request from the host device through the out-of-band communication via the sub link, and generate a signal to restart firmware of the storage processor based on the recovery request.

11. The storage system of claim 1, wherein the storage device further includes:

a dynamic random access memory (DRAM) configured to store data, and wherein the storage controller package further includes;

a DRAM interface connected to the DRAM and the on-chip bus.

12. The storage system of claim 11, wherein the microcontroller is configured to access the DRAM through the on-chip bus and the DRAM interface regardless of an operation of the storage processor.

13. The storage system of claim 1, wherein the storage device further includes:

an electrically erasable programmable read-only memory (EEPROM) configured to store product information including vital product data of the storage device, and wherein the microcontroller is configured to receive the product information from the EEPROM through an inter-integrated circuit (I2C) link, and transfer the product information to the host device through the out-of-band communication via the sub link.

14. The storage system of claim 1, wherein the storage device further includes:

one or more sensors configured to provide state information including at least one of temperature information, humidity information, voltage information or current information of the storage device, and wherein the microcontroller is configured to receive the state information from the one or more sensors through an inter-integrated circuit (I2C) link, and transfer the state information to the host device through the out-of-band communication via the sub link.

15. The storage system of claim 1, wherein the main link includes a peripheral component interconnect express (PCIe) bus, and the sub link includes a system management bus (SMBUS).

16. The storage device of claim 1, wherein the microcontroller is configured to access the nonvolatile memory device through the on-chip bus and the memory interface regardless of an operation of the storage processor.

17. A storage device comprising:

a nonvolatile memory device configured to store data; and a storage controller package configured to control the nonvolatile memory device based on information from a host device, wherein the storage controller package includes:

an on-chip bus;

a host interface connected to the on-chip bus and a main link;

a memory interface connected to the on-chip bus and the nonvolatile memory device;

a storage processor connected to the on-chip bus, and configured to access the nonvolatile memory device through the on-chip bus and to perform an in-band communication with the host device through the on-chip bus, the host interface and the main link; and a microcontroller connected to the on-chip bus and a sub link, and configured to access the nonvolatile memory device through the on-chip bus and to perform an out-of-band communication with the host device through the sub link.

18. The storage device of claim 17, wherein the storage device further includes:

a power management integrated circuit configured to receive a main power supply voltage from the host device and provide internal power supply voltages of the storage device based on the main power supply voltage, and wherein the microcontroller is configured to receive one of the internal power supply voltages from the power management integrated circuit or receive an auxiliary power supply voltage from the host device not via the power management integrated circuit.

19. The storage device of claim 17, wherein the storage processor and the microcontroller are configured to operate independently based on respective firmware.

20. A storage device comprising:

a nonvolatile memory device configured to store data; and a storage controller package configured to control the nonvolatile memory device based on information from a host device, wherein the storage controller package includes:

an on-chip bus;

a storage processor that is connected to the on-chip bus and that is configured to access the nonvolatile memory device through the on-chip bus and to perform an in-band communication with the host device through the on-chip bus and a main link connected to the host device; and a microcontroller that is connected to the on-chip bus and a sub link and that is configured to access the nonvolatile memory device through the on-chip bus and to perform an out-of-band communication with the host device through a the sub link connected to the host device.

* * * * *